(12) United States Patent
Gardner

(10) Patent No.: US 11,696,816 B2
(45) Date of Patent: Jul. 11, 2023

(54) ORTHODONTICS TREATMENT SYSTEMS AND METHODS

(71) Applicant: ORTHOSELECT, LLC, American Fork, UT (US)

(72) Inventor: Steven Nathaniel Gardner, Highland, UT (US)

(73) Assignee: ORTHOSELECT, LLC, American Fork, UT (US)

( * ) Notice: Subject to any disclaimer, the term of this patent is extended or adjusted under 35 U.S.C. 154(b) by 17 days.

(21) Appl. No.: 17/349,705

(22) Filed: Jun. 16, 2021

(65) Prior Publication Data

US 2021/0401546 A1 Dec. 30, 2021

Related U.S. Application Data

(60) Provisional application No. 63/044,307, filed on Jun. 25, 2020.

(51) Int. Cl.
*A61C 7/00* (2006.01)
*G06T 19/20* (2011.01)

(52) U.S. Cl.
CPC .............. *A61C 7/002* (2013.01); *G06T 19/20* (2013.01); *G06T 2219/20* (2013.01)

(58) Field of Classification Search
None
See application file for complete search history.

(56) References Cited

U.S. PATENT DOCUMENTS 5,125,832 A * 6/1992 Kesling ................... A61C 7/12
433/8
2010/0324875 A1* 12/2010 Kalili ................ A61C 13/0004
703/11

(Continued)

FOREIGN PATENT DOCUMENTS

KR 20180109412 A 10/2018
WO 2018069736 A1 4/2018

OTHER PUBLICATIONS

International Searching Authority, "International Search Report and Written Opinion," issued in connection with International Patent Application No. PCT/US2021/038957, dated Oct. 13, 2021 (9 pages).

*Primary Examiner* — Kee M Tung
*Assistant Examiner* — Jed-Justin Imperial
(74) *Attorney, Agent, or Firm* — Holland & Hart LLP

(57) ABSTRACT

Techniques for preparing a model (e.g., a digital model) of a person's teeth are described. The techniques include receiving a model of a maxillary arch and a mandibular arch of a person's teeth, operating an automated mesh cleaning operation to modify the model, segmenting the model to identify individual teeth and gum tissue in the model, identifying and marking features of each tooth of the model, and adjusting the individual teeth of the model into a recommended orientation relative to each other, and applying a treatment method. The treatment method may include a selection of a bracket type and an aligner type. The techniques may determine a proposed location of brackets or aligners on the individual teeth based on the applied treatment method and export a digital model of a bracket tray for formation of a bracket tray that can be used to secure the brackets to a person's teeth.

20 Claims, 34 Drawing Sheets

(56) References Cited

U.S. PATENT DOCUMENTS

| | | | |
|---|---|---|---|
| 2011/0083767 A1* | 4/2011 | Johnson | C30B 33/02 140/71 R |
| 2011/0207072 A1* | 8/2011 | Schiemann | A61C 7/146 700/98 |
| 2011/0276159 A1 | 11/2011 | Chun et al. | |
| 2014/0067334 A1 | 3/2014 | Kuo | |
| 2015/0056576 A1* | 2/2015 | Nikolskiy | A61C 13/0004 433/214 |
| 2017/0100213 A1* | 4/2017 | Kuo | A61C 7/08 |
| 2017/0105817 A1* | 4/2017 | Chun | A61C 7/12 |
| 2017/0281314 A1* | 10/2017 | Freimuller | A61C 7/145 |
| 2019/0015177 A1 | 1/2019 | Elazar et al. | |
| 2019/0152152 A1* | 5/2019 | O'Leary | B29C 64/386 |
| 2020/0146779 A1* | 5/2020 | Zhang | A61C 7/146 |

* cited by examiner

ORTHODONTICS TREATMENT SYSTEMS AND METHODS

CROSS REFERENCE

The present Application for Patent claims the benefit of U.S. Provisional Patent Application No. 63/044,307 by Steven N. Gardner, entitled "ORTHODONTICS TREATMENT SYSTEMS AND METHODS," filed Jun. 25, 2020, assigned to the assignee hereof, and which is hereby incorporated by reference in its entirety.

BACKGROUND

Orthodontics is the treatment of irregularities of the teeth including alignment and occlusion. Orthodontists have used various forms of braces to influence the position and alignment of teeth. Early attempts involved numerous methods, such as wrapping wire around individual teeth. Innovations in the 1970s included dental adhesives, allowing metal brackets to be mounted directly to the labial (outside) surface of teeth, and the replacement of gold and silver by stainless steel, thus dramatically reducing costs. A mainstay of orthodontics from this time forward has been the use of wires or elastic bands mounted to brackets adhered to the teeth. The wires or bands apply tensile forces between the brackets, gradually realigning the teeth. While this method is effective and relatively easy to implement, traditional bracket and wire braces are difficult to clean, are uncomfortable in the patient's mouth, include a long time to install and periodically adjust, and may include a long treatment duration to achieve the desired alignment. The development of 3 dimensional (3D) digital imaging has led to some improvements in orthodontics treatments. A mold of the patient's teeth, or the teeth themselves, is imaged to create a 3D digital model. This model may be adjusted using interactive computer software. It would be desirable to have a treatment method and treatment system that uses digital models of a patient's teeth to provide improvements in an orthodontics treatment plan.

SUMMARY

The described techniques relate to improved methods, systems, devices, or apparatuses for orthodontics treatment. One aspect of the present disclosure relates to a method for preparing a 3D digital model of a person's teeth for use in an orthodontics treatment plan. The method includes one or more of the following steps: receiving a digital model of at least one of a maxillary arch and a mandibular arch of a person's teeth, operating a mesh cleaning operation to modify the digital model, segmenting the digital model to identify individual teeth and gum tissue in the digital model, identifying and marking features of each tooth of the digital model, adjusting the individual teeth of the digital model into a recommended orientation relative to each other, applying a treatment method, the treatment method including selection of at least one of bracket type and aligner type, and determining proposed location of brackets or aligners on the individual teeth based on the applied treatment method.

One or more of the operating, segmenting, identifying, marking, adjusting, applying, selecting, and determining steps may be automated or at least partially automated based on operation of a software program using, for example, a processor, memory, and dental related data. The automation may be carried out using one or more algorithms, wherein input to the one or more algorithms may be user input, information collected from a previous step, data based on common patient data for a patient population, and historical data for patients with common characteristics such as size of teeth arch, size of teeth, jaw size, and the like. In one example, the user can manually adjust the segmented teeth into an ideal orientation. The automated adjustment of teeth into an ideal orientation, also referred to as teeth self-alignment into an ideal arch for one or both of the upper and lower jaws, saves significant time for the user. Once the upper and lower teeth are aligned, the system may operate to auto-fit the two arches into an ideal bite position. The system may be structured to permit the user to have a final decision making option and can modify the self-alignment of the teeth and the auto-bite fit. In at least some examples, the auto generation of an ideal case setup is intended to get the teeth into as close as perfect orientation as possible, with the expectation that the user can finish the small remaining amount of adjustment needed.

The method may also include exporting the digital model with proposed bracket locations. Receiving the digital model may include identifying different views for the digital model. Receiving the digital model may include receiving information about what type of scanner was used to create the digital model. Operating the mesh cleaning operation may include at least one of increasing resolution of digital model, repairing image data of the digital model, smoothing out surfaces of the digital model, removing extraneous data from the digital model, and reducing resolution of the digital model. The method may also include receiving user edits to the digital model to at least one of repair image data of the digital model, smooth out surfaces of the digital model, and remove extraneous data from the digital model. Segmenting the digital model may include receiving input from a user regarding accurate segmentation of the individual teeth from each other. Segmenting the digital model may include receiving input from a user regarding a change in boundary between one or more teeth and tissue of the digital model, or regarding a change in boundary between adjacent teeth of the digital model.

Displaying the web content may include identifying and marking features of each tooth. The identifying and marking may include at least one of identifying a long axis, identifying cusp tips, identifying marginal ridges between cusps, and identifying a width of each tooth. Identifying and marking features of each tooth may include receiving input from a user regarding a change in location of at least one of a long axis, cusp tips, marginal ridges between cusps, and a width of each tooth.

The method may also include applying an arch wire form to the digital model, applying the arch wire form including selecting from among, for example, natural, tapered and universal arch wire forms. There may be arch wire forms the user can choose from. The user may also be given the opportunity to modify the shape of any arch wire or design an arch wire shape from scratch. The method may also include applying an arch wire form to the digital model, applying the arch wire form including receiving a selection from the user among natural, tapered and universal arch wire forms. Adjusting the individual teeth of the digital model into a recommended orientation relative to each other may include aligning the teeth with the applied arch wire form.

Adjusting the individual teeth of the digital model into a recommended orientation relative to each other may include at least one of moving one or more of the teeth in various translation directions: side-to-side, forward and back, and up and down. The individual teeth of the digital model may be adjusting on various rotated directions: tip in angulation or roll (i.e., looking directly at the face of a tooth and rotating clockwise/counterclockwise), torque in incline and procline, buccolingual, or pitch (i.e., looking directly at the biting surface of a tooth and rotating clockwise/counterclockwise), and rotation in yaw (i.e., looking directly from the side of a tooth and rotating clockwise/counterclockwise).

Adjusting the individual teeth of the digital model into a recommended orientation relative to each other may include receiving input from a user confirming whether recommended orientation of the at least one of a maxillary arch and a mandibular arch is correct. Adjusting the individual teeth of the digital model into a recommended orientation relative to each other may include receiving input from a user regarding an occlusal bit between the maxillary arch and the mandibular arch is correct. The treatment method may include one of traditional braces, custom braces, aligners, and hybrid of traditional braces and aligners. Determining proposed location of brackets may include positioning an arch wire at a location spaced away from the occlusal plane and aligning the brackets relative to a long axis line of each tooth. Applying the treatment method may include selecting a type of bracket based on a selected treatment method and characteristic of one or more of the teeth.

The method may further include analyzing the digital model with the teeth in the recommended orientation, the analyzing including at least one of: determining whether teeth of the maxillary arch interfere with teeth of the mandibular arch, determining whether expansion or extraction of at least one of the maxillary arch and the mandibular arch is required in view of the patient's mouth size, determining whether brackets mounted to teeth of the maxillary arch interfere with brackets mounted to teeth of the mandibular arch, and determining whether bite turbos are recommended to prevent interference between brackets mounted to the teeth. The method may include exporting the digital model with recommended orientation and proposed location of brackets for use in preparing a 3D printed tray that holds the brackets or aligners.

Another aspect of the present disclosure relates to an apparatus for preparing a digital model of a person's teeth for use in an orthodontics treatment plan. The apparatus includes a processor, memory coupled with the processor, and instructions stored in the memory and executable by the processor. The instructions are operable to cause the apparatus to one or more of receive a digital model of at least one of a maxillary arch and a mandibular arch of a person's teeth, operate a mesh cleaning operation to modify the digital model, segment the digital model to identify individual teeth and gum tissue in the digital model, identify and mark features of each tooth of the digital model, adjust the identified and marked teeth of the digital model into a recommended orientation relative to each other, apply a treatment method, the treatment method including selection of at least one of bracket type and aligner type, and determine recommended locations for at least one of brackets and aligners on the individual teeth based on the applied treatment method. The instructions are also executable to receive input from a user regarding at least one of edits to the modified digital model, edits to the segmented digital model, edits to the identified and marked features, edits to the recommended orientation of one or more of the teeth, a treatment method selection, and edits to the location of the least one of brackets and aligners.

The instructions may also be executable by a processor to receive a digital model of at least one of a maxillary arch and a mandibular arch of a person's teeth, operate a mesh cleaning operation to modify the digital model, segment the digital model to identify individual teeth and gum tissue in the digital model, identify and mark features of each tooth of the digital model, adjust the identified and marked teeth of the digital model into a recommended orientation relative to each other, apply a treatment method to the recommended orientation, the treatment method including selection of at least one of bracket type and aligner type, determine recommended locations for at least one of brackets and aligners on the individual teeth based on the applied treatment method, and display at least one of the recommended locations on each of the teeth or the at least one of brackets and aligners on the teeth at the recommended locations. The instructions may be further executable to export the digital model with recommended orientation and proposed location of brackets for use in preparing a 3D printed tray that holds the brackets or aligners.

The instructions may be further executable to analyze the digital model with the teeth in the recommended orientation, the analyzing including at least one of determining whether teeth of the maxillary arch interfere with teeth of the mandibular arch, determining whether expansion or extraction of at least one of the maxillary arch and the mandibular arch is required in view of the patient's mouth size, determining whether brackets mounted to teeth of the maxillary arch interfere with brackets mounted to teeth of the mandibular arch, and determining whether bite turbos are recommended to prevent interference between brackets mounted to the teeth.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
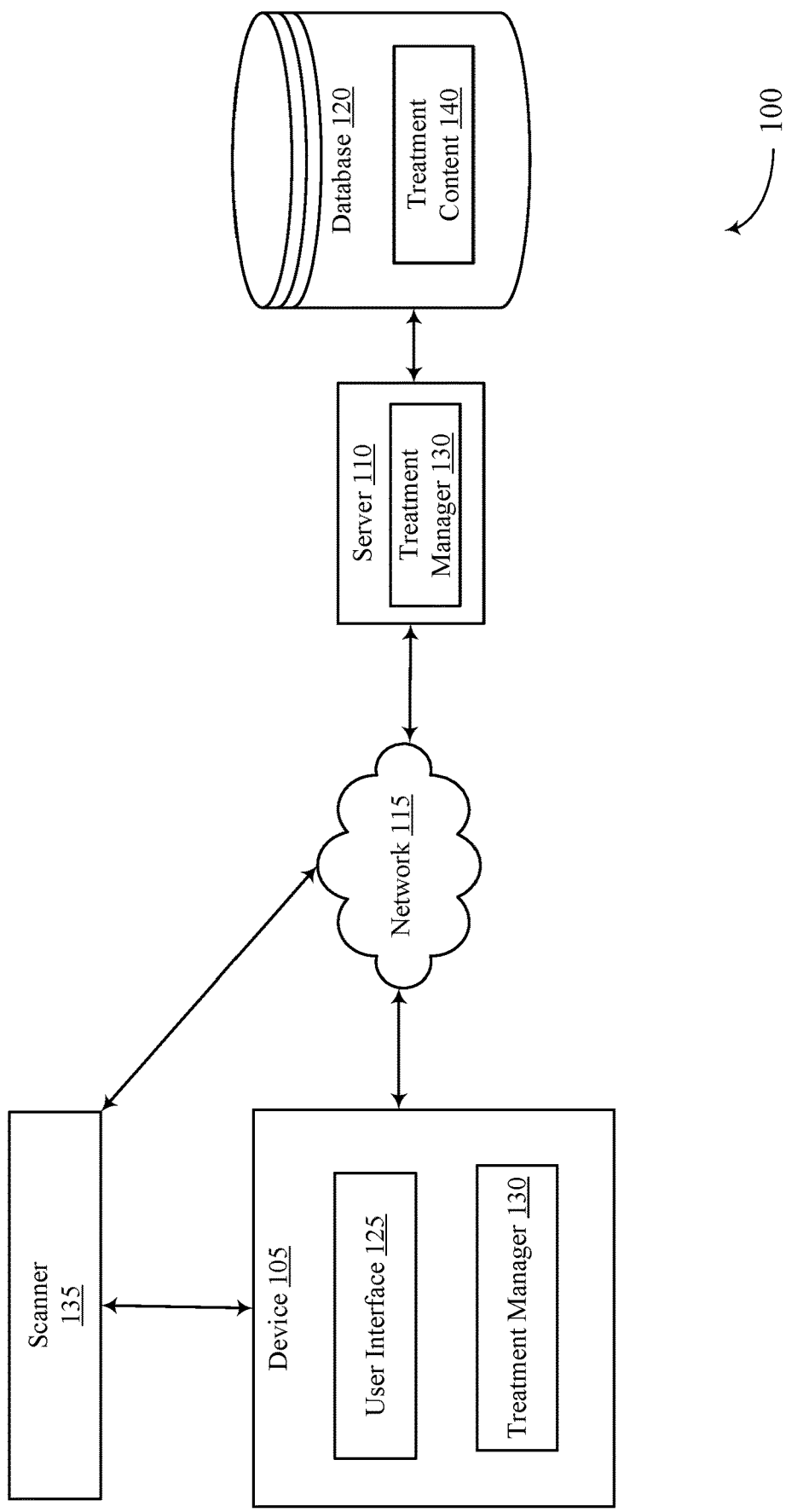
FIG. 1 illustrates an example of a treatment system in accordance with aspects of the present disclosure.

The present disclosure relates to digital direct bonding systems and related methods. The systems and methods disclosed herein utilized advanced bracket-positioning software and the latest 3D printing technology to create precision indirect bonding trays. These trays position the orthodontics brackets more precisely on the teeth and provide for highly accurate bonding to a patient's teeth. The systems and methods disclosed herein provide for improved accuracy, greater ease, and increased speed as compared to traditional direct bonding and other indirect bonding techniques. As a result, the systems and methods disclosed herein provide for a reduced cost and simplified approach to bonding orthodontics brackets to a person's teeth and an overall orthodontics treatment plan.

The systems and methods disclosed herein provide a number of advantages. For example, these systems and methods disclosed herein provide for increased accuracy in placing brackets in position on a person's teeth, as well as improved positioning of the brackets in a way that results in straightening of the teeth into an ideal or recommended orientation relative to each other without having to reposition the brackets on the teeth and/or use extensive wire bending in order to provide the desired result. Consequently, the overall amount of time to complete treatment is reduced and the results (i.e., straightened teeth) can be improved overall.

Another advantage relates to reducing or even eliminating bracket repositioning during treatment. Bracket repositioning can be eliminated if the brackets are positioned on a tooth at a location that results in the tooth obtaining a desired orientation at completion of treatment. By determining that precise location for the bracket in advance through modeling of the teeth pre-treatment and post-treatment, a bracket tray can be created to position the brackets at an ideal location at the outset of treatment.

Another advantage relates to the use of bracket trays, which reduce the amount of time to mount the brackets to a patient's teeth. Thus, the positioning of the brackets is automated, and the position is more precise to provide a desired output, as well as the total amount of time to mount the brackets is also significantly reduced as compared to traditional bracket mounting methods.

These treatment systems and treatment methods disclosed herein are focused on generating a digital model of a bracket tray that may be exported to a forming device such as a 3D printing device for creation of the bracket tray. The treatment systems and treatment methods disclosed herein may involve a user interface wherein an operator of a computing device may interface with the system, provide some inputs (e.g., selecting a digital model of a person's teeth for input into the system, confirming that the digital model is in an accurate orientation, confirming completion of certain steps, and modifying markers that identify certain features of individual teeth of the digital model), while other aspects of the system perform steps automatically based on algorithms and limited operator input. The systems and methods disclosed herein may generate an ideal or recommended orientation of teeth that represent a desired post-treatment result from an orthodontics treatment plan. An operator of the system may select among various treatment plans (e.g., different types of brackets, aligners, and the like) as well as an arch wire shape that best matches a natural jaw shape of the patient. The operator may compare this recommended or ideal orientation of teeth to the pre-treatment arrangement of teeth as well as to other teeth orientation that may result from different treatment plan selections or other operator inputs. The operator may provide various levels of operator input via, for example, a user interface for the system to fine tune or customize a variety of variables and aspects of the systems and methods.

The systems and methods disclosed herein may provide various images or models for review by an operator. For example, the system may operate to provide a visual comparison for the operator between a pre-treatment model of the person's teeth and an ideal or recommended orientation that represents completion of treatment. In some examples, the operator may customize their inputs to provide the shortest amount of treatment time as compared to a most ideal orientation of the person's teeth through a general or recommended treatment plan. Another aspect of the present disclosure relates to providing an electronic digital model, set of drawings, or the like for creating a bracket tray used to mount orthodontics brackets, aligners, or the like to the person's teeth in order to complete a desired treatment plan.

Aspects of the disclosure are initially described in the context of a system. Aspects of the disclosure are further illustrated by and described with reference to a flow diagrams and user interfaces. Aspects of the disclosure are further illustrated by and described with reference to apparatus diagrams, system diagrams, and the like that relate to creating digital models of a person's teeth, applying treatment plans to such models, and generating a digital model of a tray for mounting brackets and/or aligners to the person's teeth.

In order to operate an example system in accordance with the present disclosure, an initial step includes opening the application on, for example, a computing device, such as one of the computing devices described above with reference to FIG. 1. Opening the application may include entering in login information such as username, password, or other credentials. An operator may select amongst opening a new case, opening an existing case, or opening an archived case. Once the application is open, FIG. 1 illustrates an example of a treatment system 100 in accordance with aspects of the present disclosure. The treatment system 100 may include a computing device 105, a server 110, a network 115, and a database 120. The computing device 105 may include a user interface 125 and a treatment manager 130. The computing device 105 may receive one or more data files comprising a 3D image of a person's teeth. The 3D image may be generated by a scanner 135. The scanner 135 may communicate with the computing device 105 directly or via the network 115. The server 110 may include a treatment manager 130, such as some aspect of the treatment manager 130 operated by the computing device 105, or a different version of the treatment manager 130 at a location remote and/or separate from the computing device 105.

Examples of the computing device 105 may include any combination of, for example, mobile devices, smart phones, personal computing devices, computers, laptops, desktops, servers, media content set top boxes, or any combination thereof. Examples of the server 110 may include, for example, a data server, a cloud server, proxy server, mail server, web server, application server, database server, communications server, file server, home server, mobile server, name server, or any combination thereof. Examples of the scanner 135 (also referred to as an impression scanner or intra-oral scanner) include, for example, iTero®, Trios®, and CareStream® scanners.

Although the computing device 105 and the scanner 135 are depicted as connecting to the server 110 via the network 115, in some examples, the computing device 105 may connect directly to the network 115 and/or the database 120. In some examples, the computing device 105 and/or the scanner 135 may connect or attach to the server 110 and/or the database 120 via a wired or wireless connection, or both. In some examples, the computing device 105 and/or the scanner 135 may attach to any combination of a port, socket, and slot of the server 110 and/or the database 120.

In some examples, the computing device 105 may include a user interface 125 and the treatment manager 130. Although the components of the computing device 105 are depicted as being internal to the computing device 105, it is understood that one or more of the components may be external to the computing device 105 and connect to other components of the treatment system 100 through wired or wireless connections, or both. Examples of the treatment manager 130 may include a web browser, a software application, a desktop application, a mobile application, etc. In some examples, the treatment manager 130 may be installed on the computing device 105 in order to allow an operator to interface with a function of the computing device 105, the server 110, the database 120, or the scanner 135.

Although the computing device 105 is illustrated with an exemplary single treatment manager 130, in some examples, the treatment manager 130 may represent two or more different applications installed on, running on, or associated with the computing device 105. In some examples, the treatment manager 130 may include one or more software programs or algorithms. In some cases, the treatment manager 130 may include source code of a software program or algorithm. The one or more software programs or algorithms may include, for example, script code, hypertext markup language code, procedural computer programming code, compiled computer program code, object code, uncompiled computer program code, object-oriented program code, class-based programming code, cascading style sheets code, or any combination thereof. In some examples, the software programs or algorithms may include an applet installed on the computing device 105. The software programs or algorithms may include an extension (e.g., software module), or plug-in, or add-on, added to or integrated with a software application of the computing device 105 (e.g., integrated with a web browser, etc.). In some examples, the computing device 105 may download the one or more software programs or algorithms from the server 110, or from the database 120, or from another server (e.g., a third server not shown).

Examples of the network 115 may include any combination of cloud networks, local area networks (LAN), wide area networks (WAN), virtual private networks (VPN), wireless networks (using 802.11, for example), cellular networks (using third generation (3G), fourth generation (4G), such as Long-Term Evolution (LTE), or fifth generation (5G), for example), etc. In some examples, the network 115 may include the Internet. In some examples, the computing device 105 may not include the treatment manager 130. For example, the computing device 105 may include an application that allows the computing device 105 to interface with a separate device via the treatment manager 130 being located on another device such as the server 110 or the database 120, or any combination thereof.

In some examples, at least one of the computing device 105, the server 110, and the database 120 may include the treatment manager 130, where at least a portion of the functions of the treatment manager 130 are performed separately or concurrently on the computing device 105, the server 110, or the database 120. In some examples, an operator may access the functions of the computing device 105 (directly or through the computing device 105 via the treatment manager 130) from the server 110 or the database 120. In some examples, the computing device 105 includes a mobile application that interfaces with one or more functions of the treatment manager 130, the server 110, or the database 120.

The server 110 may be coupled to the database 120. The database 120 may be internal or external to the server 110. In one example, the computing device 105 may be coupled to the database 120. In some examples, the database 120 may be internally or externally connected directly to the computing device 105. Additionally or alternatively, the database 120 may be internally or externally connected directly to the computing device 105 or one or more network devices such as a gateway, switch, router, intrusion detection system, etc. The database 120 may include treatment content 140. In some examples, the computing device 105 may access or download the treatment content 140 from the database 120 over the network 115 via the server 110. The treatment content 140 may include data regarding content of an orthodontics-related treatment plan (e.g., source code, text, text files, image files, etc.). In some examples, the treatment content 140 may include data associated with a digital model or image of a person's teeth, or a data associated with a digital model or image of an orthodontics-related device, such as a tray that holds at least one of brackets and aligners for use in mounting braces to a person's teeth. In some examples, the treatment content 140 or source code of the treatment content 140 or source code of the web page associated with the treatment content 140 may include procedural computer programming code, compiled computer program code, object code, uncompiled computer program code, object-oriented program code, class-based programming code, cascading style sheets code, or any combination thereof.

The treatment manager 130 may enable creation of an ideal or recommend arrangement of teeth based on an original or pre-treatment set of teeth impressions or a digital model of a person's teeth. The treatment manager 130 may further enable creation of a recommended placement or positioning of brackets and/or aligners to the pre-treatment model of a person's teeth. The treatment manager 130 may further enable creation of digital model and associated drawing file that may be exported for forming a bracket tray. The bracket tray may be configured to position actual brackets to the person's actual teeth at locations that should result in positioning of the teeth during treatment substantially as shown in the recommended or ideal arrangement of teeth generated by the treatment manager 130. In some examples, the treatment manager 130 may also be configured to perform the methods and operate, at least in part, in conjunction with the user interface 125 and other aspects of the computing device 105 and the treatment system 100. The user interface 125 may enable an operator to interact with, control, or program one or more functions of the treatment manager 130.

Figure 2:
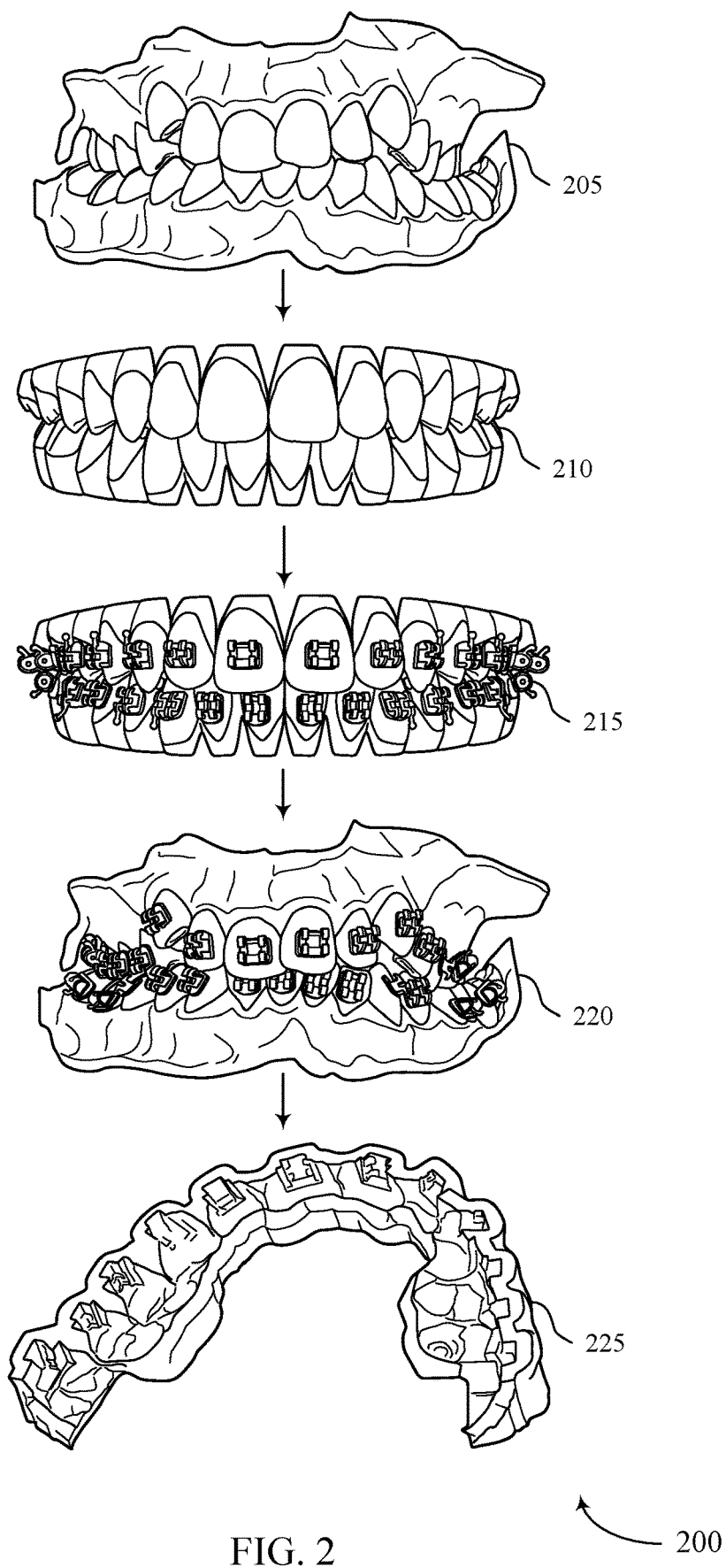
FIGS. 2 through 11 illustrate examples of methods in accordance with aspects of the present disclosure.

FIG. 2 illustrates an example of a method 200 in accordance with aspects of the present disclosure. The operations of the method 200 may be implemented by one or more of a computing device 105 or a server 110 or its components as described herein. In some examples, one or more of the computing device 105 or the server 110 may execute a set of instructions to control the functional elements of the computing device 105 or the server 110 to perform the described functions. Additionally or alternatively, one or more of the computing device 105 or the server 110 may perform aspects of the described functions using special-purpose hardware. The method 200 may include digital models for different stages of the method 200.

A pre-treatment model 205 is a digital model of a person's teeth. The pre-treatment model 205 is imported into a treatment system (e.g., the treatment system 100 as described with reference to FIG. 1) or application (e.g., a computing device 105). Through a variety of operations of the treatment system, some automated based on operation of one or more algorithms, and others responsive to inputs from an operator of the treatment system, an ideal or recommended orientation of teeth from the pre-treatment model 205 is generated and presented as a model 210. The treatment system operator may select one or more treatment methods, which may include brackets, aligners, or the like. A model 215 shows brackets of a selected treatment method positioned on the model 210. The treatment system may operate to change the teeth of the model 215 back to the pre-treatment orientation with the brackets mounted thereto, which is displayed as a model 220. The pre-treatment orientation of the teeth with the bracket mounted thereon in the model 220 is used to create a digital model of a bracket tray as shown in a model 225. The model 225 may be exported for use by a tray forming device to create an actual bracket tray that includes a plurality of bracket seats receptive of actual brackets (e.g., the brackets shown in the model 220). The tray also includes seats to interface with each individual tooth of the patient.

The models shown in FIG. 2 are exemplary, and do not represent the comprehensive number of models, images or steps associated with implementing the treatment systems and treatment methods disclosed herein. FIG. 2 is intended to provide a general overview of how the treatment systems and treatment methods disclosed herein generate a series of models that can be generated and displayed, as well as creation of a digital model of a bracket tray that can be exported for use in creating an actual bracket tray for mounting orthodontics brackets to a patient's teach according to a digital direct bonding system and related methods.

Figure 3:
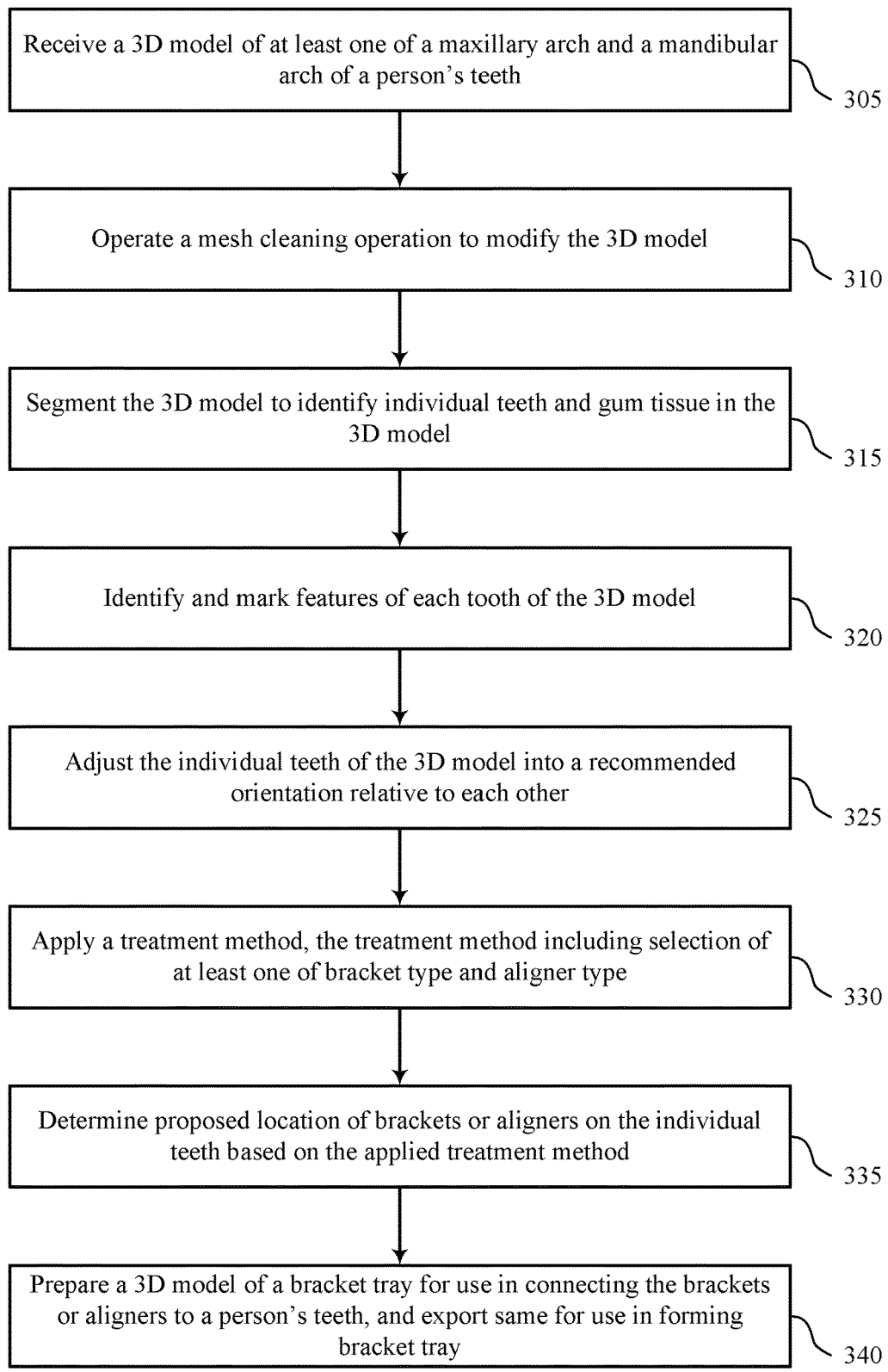

FIG. 3 shows a flowchart illustrating a method 300 in accordance with aspects of the present disclosure. The operations of the method 300 may be implemented by a treatment system and/or device (e.g., a computing device) or its components as described herein. For example, the operations of the method 300 may be performed by a treatment manager or a treatment system as described with reference to FIGS. 1, 33, and 34, to carry out functions such as those described with reference to the flow diagrams of FIGS. 4 through 11 and the user interfaces described with reference to FIGS. 12 through 31. In some examples, a treatment system and/or device (e.g., a computing device) may execute a set of instructions to control the functional elements described herein. Additionally or alternatively, a treatment system and/or device (e.g., a computing device) may perform aspects of the functions described herein using special-purpose hardware.

At 305, the method 300 includes receiving a digital model of at least one of a maxillary arch and a mandibular arch of a person's teeth. The digital model is loaded into a treatment system, such as a computing device and associated software. At 310, the method 300 includes operating a mesh cleaning operation to modify the 3D model. Some aspects of the mesh cleaning operation may occur automatically based on one or more algorithms. The mesh cleaning operation may include removing extraneous surfaces and data from the 3D model, increasing or decreasing resolution of the 3D model, and other techniques specific to preparing the 3D model for further processing, manipulation, analysis, and the like associated with other operations of the method 300. Some aspects of the mesh cleaning may include input from an operator including, for example, selecting extraneous surfaces or features to remove from the 3D model, and the like.

At 315, the method 300 includes segmenting the 3D model to identify individual teeth and gum tissue in the 3D model. Some aspects of the segmenting operation may occur automatically based on one or more algorithms. Operator input may be received to further identify features that may be labeled or characterized as teeth features versus gum tissue related to identifying a boundary between the teeth and gum tissue. The segmenting may also include labeling the individual teeth with identifiers and requesting confirmation from an operator that the labeling is correct.

At 320, the method 300 includes identifying and marking features of each tooth of the 3D model. Some aspects of the identifying and marking operation may occur automatically based on one or more algorithms. The features to be marked may include, for example, occlusal markers, longitudinal axis, marginal ridges, and mesial/distal markers of each tooth in the digital model. In some examples, the method 300 may include receiving operator input regarding revisions to a location of the markers and/or their identification features. The identifying may also include selecting an arch wire shape that most closely matches the jaw line of the digital model. Selecting the arch wire may occur automatically or may include operator input.

At 325, the method 300 includes adjusting the individual teeth of the 3D model into a recommended orientation (also referred to as an ideal setting) relative to each other. Some aspects of the ideal setting step may occur automatically based on one or more algorithms. The adjusting may include translating and rotating individual teeth of the 3D model, as well as adjusting a bite or relative position between the mandibular arch and maxillary arch. In some examples, the method 300 include receiving operator input about modifications to the adjusted position of the individual teeth so as to fine tune or otherwise improve the recommended orientation.

At 330, the method 300 includes applying a treatment method, the treatment method includes selection of at least one of bracket type and aligner type. For example, the method may include selection of at least one of bracket type and aligner type for orthodontic treatment of the teeth represented in the 3D model. Some aspects of the selecting treatment method operation may occur automatically based on one or more algorithms. In some examples, the method 300 may include receiving a selection among one or more treatment methods by an operator of the treatment system. The selected treatment method may be used to create a projected orientation for the 3D model representing post-treatment. In some other examples, the method 300 may include receiving operator inputs regarding changes in treatment method to or closely match the recommended orientation with the after-treatment orientation of the teeth.

At 335, the method 300 includes determining proposed locations of brackets and aligners on the individual teeth based on the selected treatment method. Some aspects of the method 300 may occur automatically based on one or more algorithms. These determined proposed locations may be illustrated via a user interface. For example, the operations at 335 may include toggling between the 3D model with brackets or aligners mounted to the recommended orientation and a pre-treatment orientation of the teeth with the brackets mounted thereto. In some other examples, the operations at 335 may further include analysis of the proposed locations of the brackets or aligners. The analysis may include receiving modifications from an operator regarding the locations of the brackets or aligners, a change in relative position between the maxillary and mandibular arches, and the like.

At 340, the method 300 includes preparing a 3D model of a bracket tray for use in connecting the brackets or aligners to a person's teeth, and export same for use in forming bracket tray. For example, the method 300 may include exporting a digital model (e.g., a 3D model) of a bracket tray for mounting brackets to the person's teeth further represented in the digital model. Some aspects of the operations performed at 340 may occur automatically based on one or more algorithms. The 3D model of the bracket tray may be displayed for the operator in advance of the exporting. The exporting may include delivering the 3D model of the bracket tray to a tray forming device such as, for example, a 3D printer. The bracket tray, after formation using the digital model of the bracket tray, may be used to secure brackets or aligners to the person's teeth as part of a digital indirect bonding system.

The operations of the method 300 shown in FIG. 3 are exemplary. The method 300 may include fewer or greater numbers of operations than those illustrated in FIG. 3. Further detail regarding the individual operations of the method 300 are provided below with reference to FIGS. 4 through 11.

Figure 4:
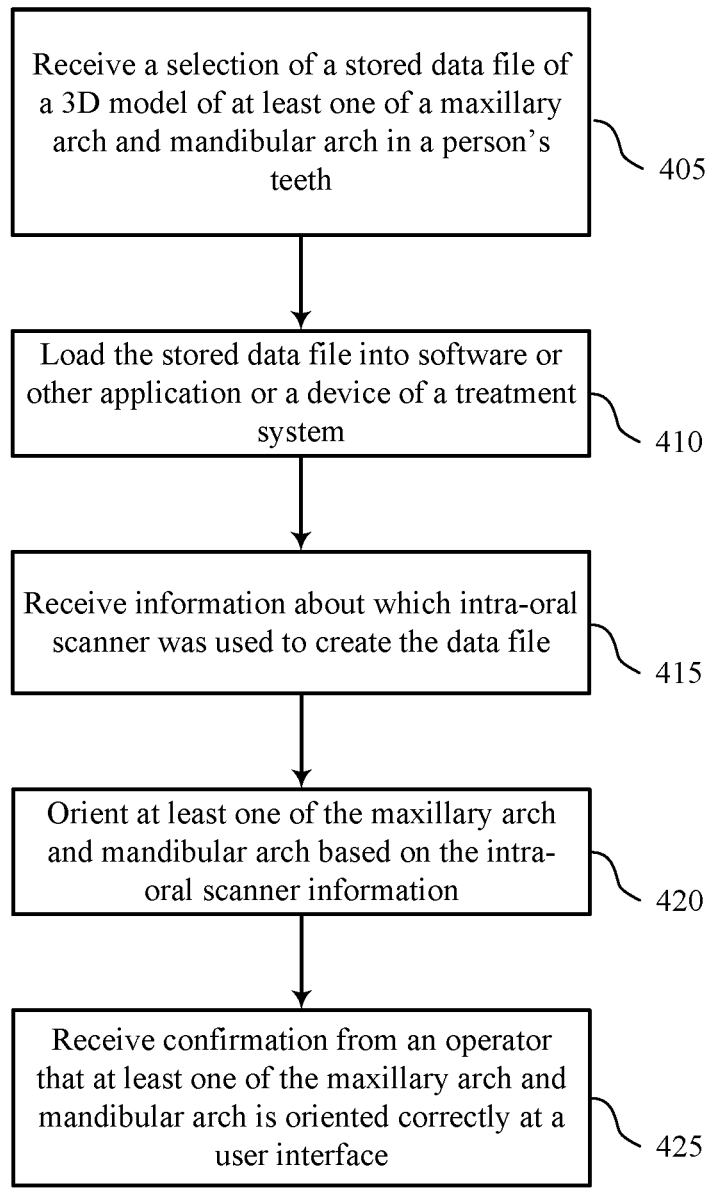

FIG. 4 shows a flowchart illustrating a method 400 in accordance with aspects of the present disclosure. The method 400 may relate to the method operation 305 shown in FIG. 3 of importing a digital model of at least one of a maxillary arch and a mandibular arch of a person's teeth. The operations of the method 400 may be implemented by a device (e.g., a computing device) or its components as described herein. For example, the operations of the method 400 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 405, the method 400 includes receiving a selection of a stored data file of a 3D model of at least one of a maxillary arch and mandibular arch in a person's teeth. The selection may be made by an operator of the treatment system. At 410, the method 400 includes loading the stored data file into software or other application or a device of a treatment system. At 415, the method 400 includes receiving information about which intra-oral scanner was used to create the data file. The treatment system may include intra-oral scanners from which an operator may select among. At 420, the method 400 includes orienting at least one of the maxillary arch and mandibular arch based on the intra-oral scanner information. At 425, the method 400 includes receiving confirmation from an operator that at least one of the maxillary arch and mandibular arch is oriented correctly at a user interface (e.g., a display screen).

Figure 5:
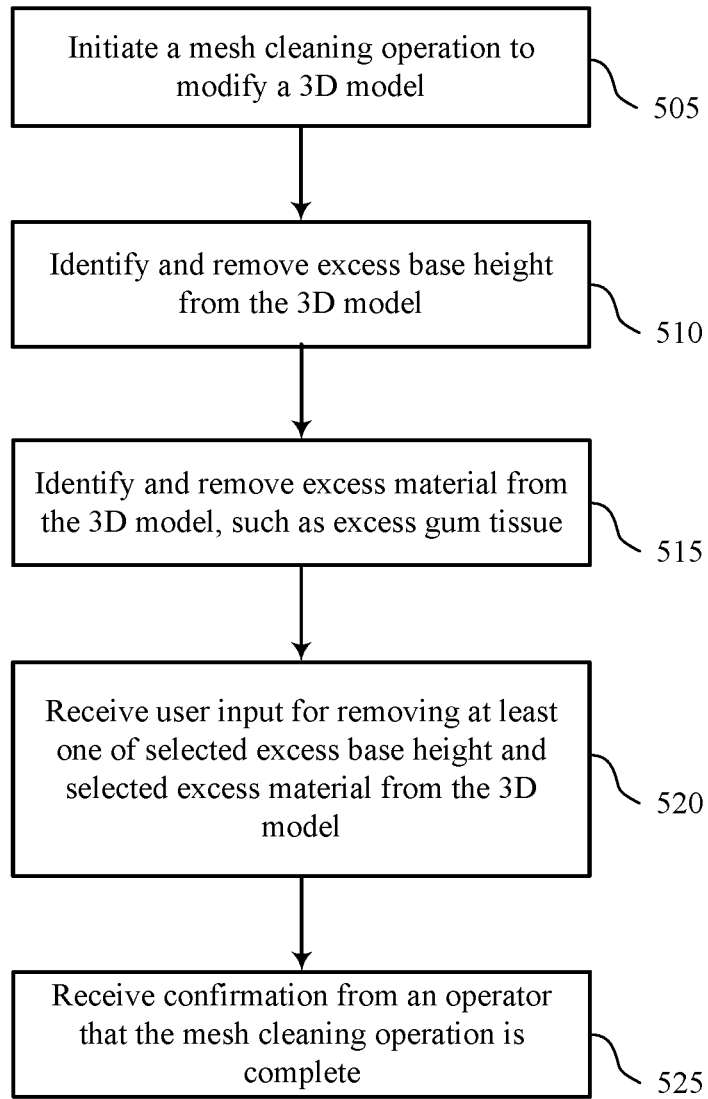

FIG. 5 shows a flowchart illustrating a method 500 in accordance with aspects of the present disclosure. The method 500 may relate to the method operation 310 shown in FIG. 3 of operating a mesh cleaning operation to modify the digital model. The operations of the method 500 may be implemented by a device (e.g., a computing device) or its components as described herein. For example, the operations of the method 500 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 505, the method 500 includes initiating a mesh cleaning operation to modify a 3D model. The mesh cleaning operation may be initiated automatically upon importing the 3D model according to the method 400. At 510, the method 500 includes identifying and removing excess base height from the 3D model. At 515, the method 500 includes identifying and removing excess material from the 3D model, such as excess gum tissue. At 520, the method 500 includes receiving user input for removing at least one of selected excess base height and selected excess material from the 3D model. The method 500 may include a plurality of options for the operator to select base height, tissue, and other excess material from a displayed digital model. At 525, the method 500 includes receiving confirmation from an operator that the mesh cleaning operation is complete.

Figure 6:
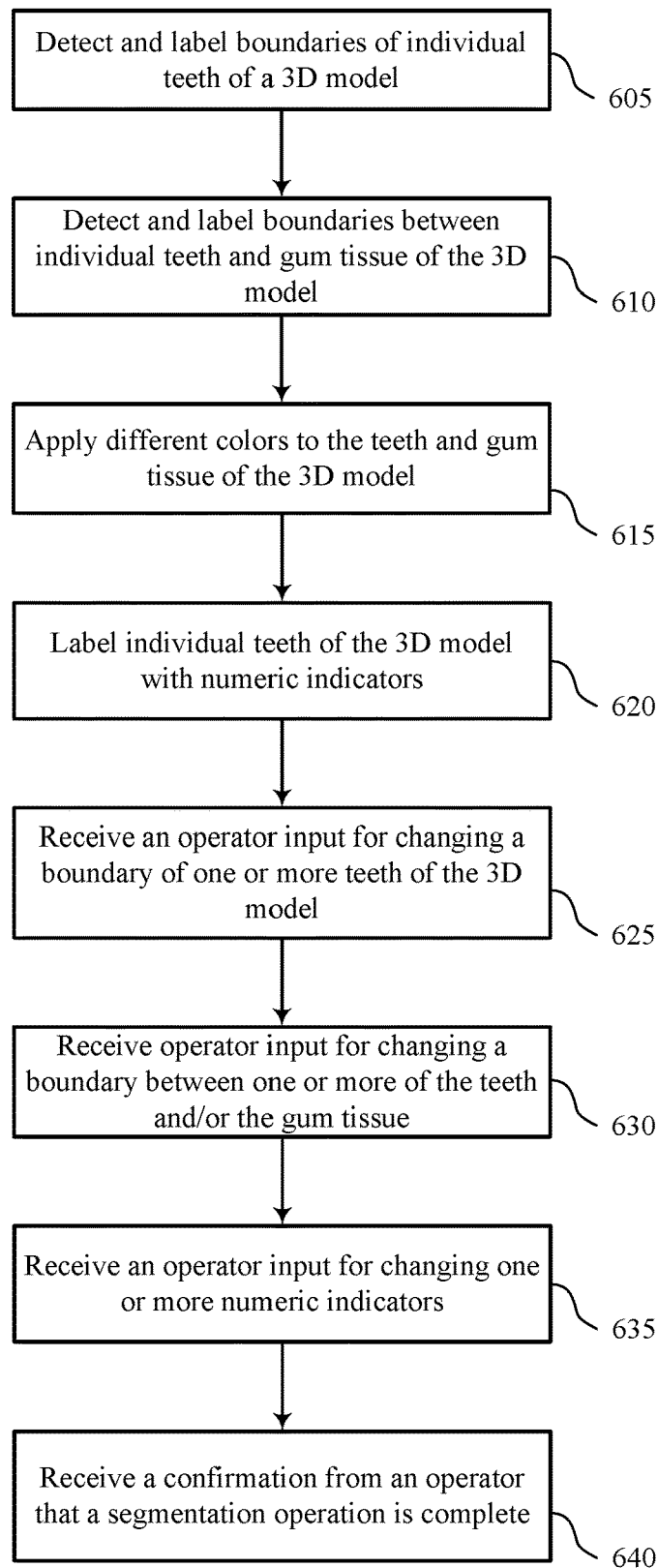

FIG. 6 shows a flowchart illustrating a method 600 in accordance with aspects of the present disclosure. The method 600 may relate to the method operation 315 shown in FIG. 3 of segmenting a 3D model to identify individual teeth and gum tissue in the 3D model.

The operations of the method 600 may be implemented by a device (e.g., a computing device) or its components as described herein. For example, the operations of the method 600 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 605, the method 600 includes detecting and labeling boundaries of individual teeth of a 3D model. At 610, the method 600 includes detecting and labeling boundaries between individual teeth and gum tissue of the 3D model. At 615, the method 600 includes applying different colors to the teeth and gum tissue of the 3D model. At 620, the method 600 includes labeling individual teeth of the 3D model with numeric indicators. At 625, the method 600 includes receiving an operator input for changing a boundary of one or more teeth of the 3D model. At 630, the method 600 includes receiving an operator input for changing a boundary between one or more of the teeth and/or the gum tissue. At 635, the method 600 includes receiving an operator input for changing one or more numeric indicators. At 640, the method 600 includes receiving a confirmation from an operator that a segmentation operation is complete.

Figure 7:
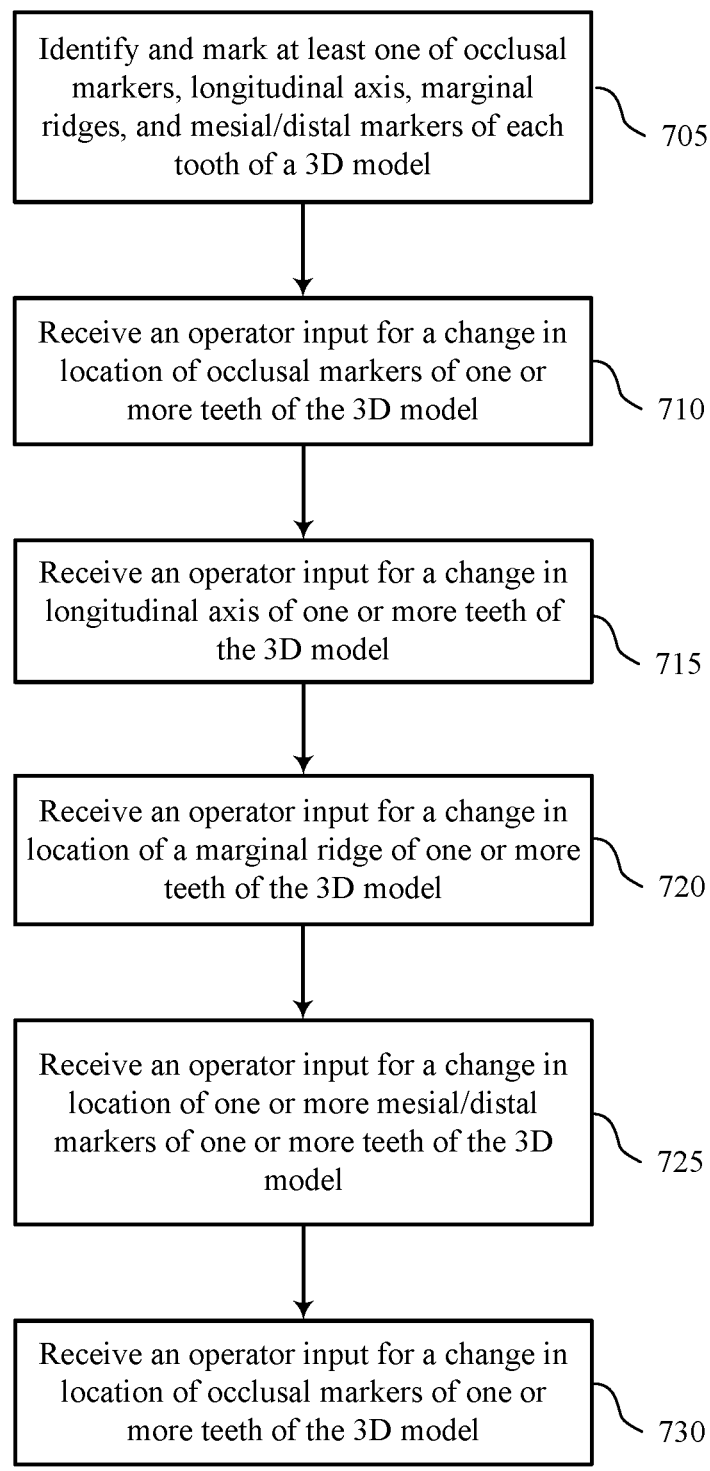

FIG. 7 shows a flowchart illustrating a method 700 in accordance with aspects of the present disclosure. The method 700 may relate to the method operation 320 shown in FIG. 3 of identifying and marking features of each tooth of a 3D model. The operations of the method 700 may be implemented by a device (e.g., a computing device) or its components as described herein. For example, the operations of the method 700 may be performed by a treatment manager or a treatment system as described with reference to FIGS. 1, 33, and 34, and a treatment system whose functions are describe with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 705, the method 700 includes identifying and marking at least one of occlusal markers, longitudinal axis, marginal ridges, and mesial/distal markers of each tooth of a 3D model. At 710, the method 700 includes receiving an operator input for a change in location of occlusal markers of one or more teeth of the 3D model. At 715, the method 700 includes receiving an operator input for a change in longitudinal axis of one or more teeth of the 3D model. At 720, the method 700 includes receiving an operator input for a change in location of a marginal ridge of one or more teeth of the 3D model. At 725, the method 700 includes receiving an operator input for a change in location of one or more mesial/distal markers of one or more teeth of the 3D model. At 730, the method 700 includes receiving an operator selection of an arch wire shape for at least one of the maxillary arch and mandibular arch. At 735, the method 700 includes receiving a confirmation from an operator that an identification and marking of teeth feature operation is complete.

Figure 8:
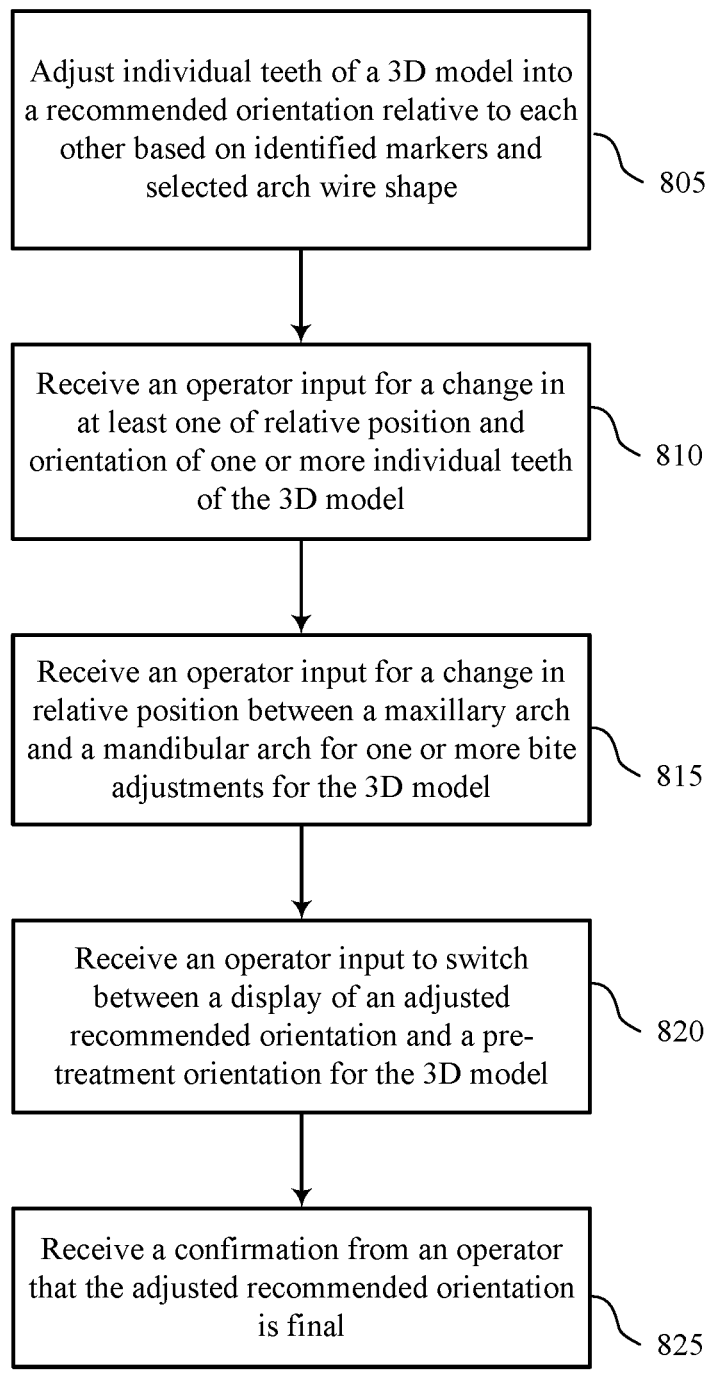

FIG. 8 shows a flowchart illustrating a method 800 in accordance with aspects of the present disclosure. The method 800 may relate to the method operation 325 shown in FIG. 3 of adjusting individual teeth of a 3D model into a recommended orientation relative to each other. The operations of the method 800 may be implemented by a device (e.g., a computing device) or its components as described herein. For example, the operations of method 800 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 805, the method 800 includes adjusting individual teeth of a 3D model into a recommended orientation relative to each other based on identified markers and selected arch wire shape. The recommended orientation may be referred to as an ideal orientation, ideal setting, or ideal arrangement of the teeth. At 810, the method 800 includes receiving an operator input for a change in at least one of relative position and orientation of one or more individual teeth of the 3D model. At 815, the method 800 includes receiving an operator input for a change in relative position between a maxillary arch and a mandibular arch for one or more bite adjustments for the digital model. At 820, the method 800 includes receiving an operator input to switch between a display of an adjusted recommended orientation and a pre-treatment orientation for the 3D model. At 825, the method 800 includes receiving a confirmation from an operator that the adjusted recommended orientation is final.

Figure 9:
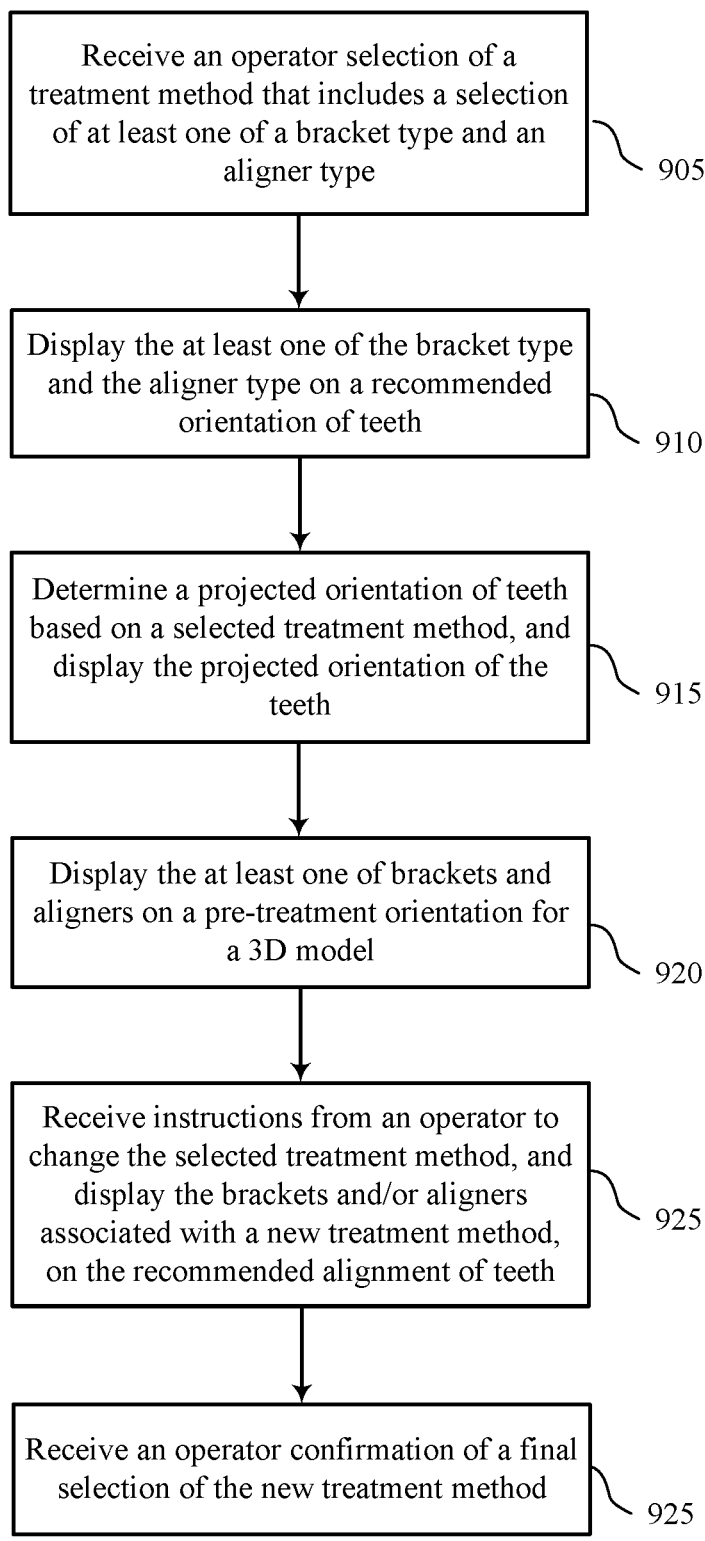

FIG. 9 shows a flowchart illustrating a method 900 in accordance with aspects of the present disclosure. The method 900 may relate to the method operation 330 shown in FIG. 3 of applying a treatment method, the treatment method including a selection of at least one of a bracket type and an aligner type. The operations of the method 900 may be implemented by a device (e.g., a computing device) or its components as described herein. For example, the operations of the method 900 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 905, the method 900 includes receiving an operator selection of a treatment method that includes a selection of at least one of a bracket type and an aligner type. At 910, the method 900 includes displaying the at least one of the bracket type and the aligner type on a recommended orientation of teeth. At 915, the method 900 includes determining a projected orientation of teeth based on a selected treatment method and display the projected orientation of the teeth. At 920, method 900 includes displaying the at least one of brackets and aligners on a pre-treatment orientation for a 3D model. At 925, the method 900 includes receiving instructions from an operator to change the selected treatment method and display the brackets and/or aligners associated with a new treatment method, on the recommended alignment of teeth. At 930, the method 900 includes receiving an operator confirmation of a final selection of the new treatment method.

Figure 10:
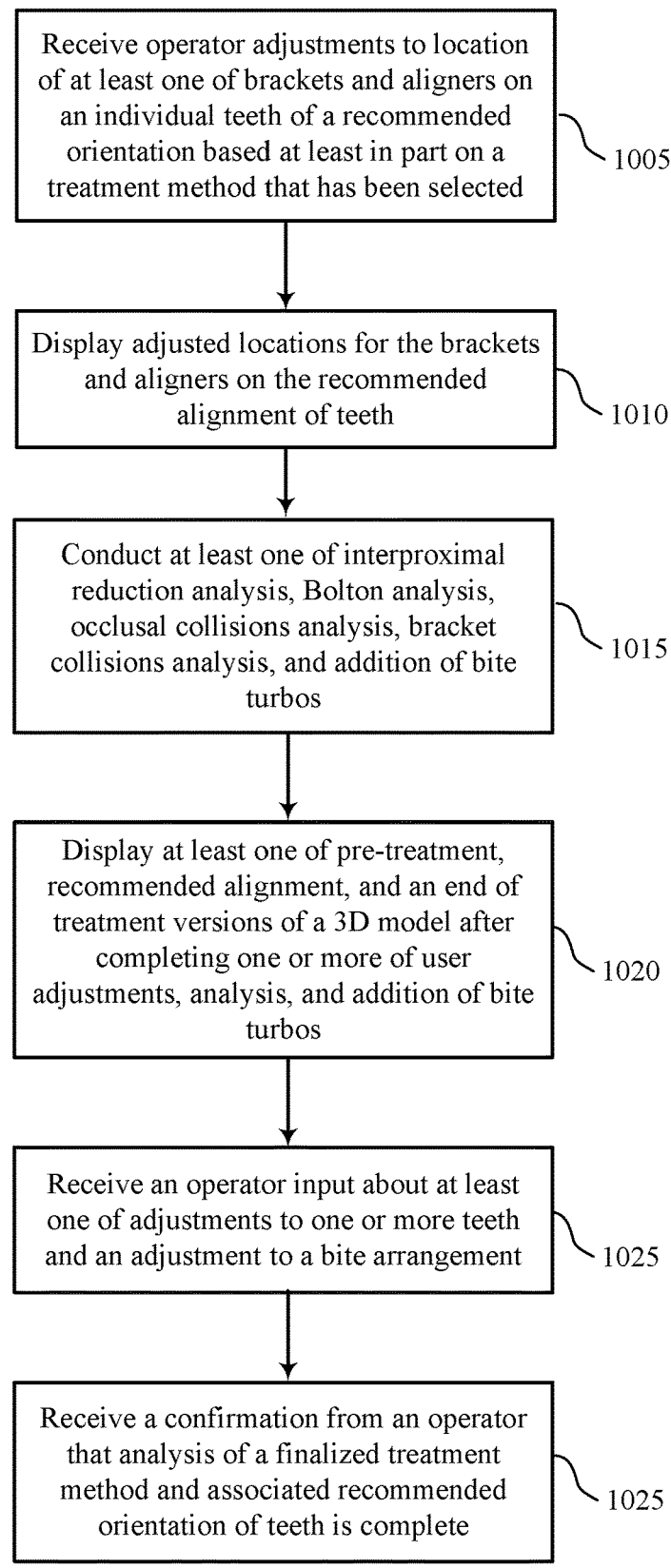

FIG. 10 shows a flowchart illustrating a method 1000 in accordance with aspects of the present disclosure. The method 1000 may relate to the method operation 335 shown in FIG. 3 of determining a proposed location of brackets or aligners on an individual teeth based on an applied treatment method. The method operation 335 may include aspect of analyzing a recommended orientation of the teeth based on the selected treatment method. The operations of the method 1000 may be implemented by a device (e.g., a computing device) or its components as described herein. For example, the operations of the method 1000 may be performed by a treatment manager or a treatment system as described with reference to FIGS. 1, 33, and 34, and a treatment system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 1005, the method 1000 includes receiving operator adjustments to location of at least one of brackets and aligners on an individual teeth of a recommended orientation based at least in part on a treatment method that has been selected according to the method 900. At 1010, the method 1000 includes displaying adjusted locations for the brackets and aligners on the recommended alignment of teeth. At 1015, the method 1000 includes conducting at least one of interproximal reduction analysis, Bolton analysis, occlusal collisions analysis, bracket collisions analysis, and addition of bite turbos. At 1020, the method 1000 includes displaying at least one of a pre-treatment, a recommended alignment, and an end of treatment versions of a 3D model after completing one or more of user adjustments, analysis, and addition of bite turbos. At 1025, the method 1000 includes receiving an operator input about at least one of adjustments to one or more teeth and an adjustment to a bite arrangement. At 1030, the method 1000 includes receiving a confirmation from an operator that analysis of a finalized treatment method and associated recommended orientation of teeth is complete.

Figure 11:
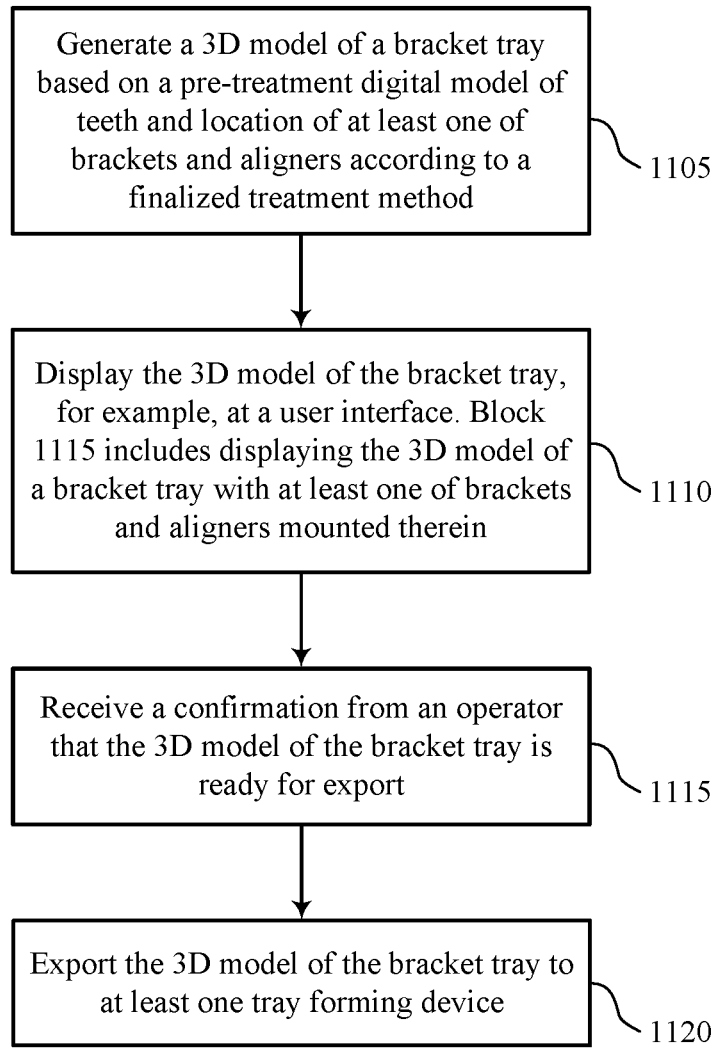

FIG. 11 shows a flowchart illustrating a method 1100 in accordance with aspects of the present disclosure. The method 1100 may relate to the method operation 340 shown in FIG. 3 of exporting a 3D model of a bracket tray for mounting brackets to a person's teeth. The operations of the method 1100 may be implemented by a device (e.g., a computing device) or its components as described herein. For example, the operations of the method 1100 may be performed by a treatment manager or treatment system as described with reference to FIGS. 1, 33, and 34, and a system whose functions are described with reference to the flowcharts of FIGS. 4 through 11 and the user interfaces described with reference to FIGS. 12 through 31. In some examples, a device (e.g., a computing device) may execute a set of instructions to control the functional elements described herein. Additionally or alternatively, a device (e.g., a computing device) may perform aspects of the functions described herein using special-purpose hardware.

At 1105, the method 1100 includes generating a 3D model of a bracket tray based on a pre-treatment digital model of teeth and location of at least one of brackets and aligners according to a finalized treatment method. At 1110, the method 1100 includes displaying the 3D model of the bracket tray, for example, at a user interface. At 1115, the method 1100 includes displaying the 3D model of a bracket tray with at least one of brackets and aligners mounted therein. At 1120, the method 1100 includes receiving a confirmation from the operator that the digital model of the bracket tray is ready for export. At 1125, the method 1100 includes exporting the 3D model of the bracket tray to at least one tray forming device. The exported 3D model of the bracket tray may include, for example, a drawing file such as a 3D computer-aided design (CAD) drawing file.

FIGS. 12 through 31 illustrate examples user interfaces in accordance with aspects of the present disclosure. In some examples, FIGS. 12 through 31 illustrate screenshots from a user interface associated with an example of the treatment systems and treatment methods described herein. The treatment system used to generate the user interfaces represented in FIGS. 12 through 31 may be one example of the treatment system 100 shown in FIG. 1 and/or the treatment manager 130 and/or the computing device 105 shown in FIG. 33, or the treatment systems shown in FIGS. 33 and 34. Some aspects of the methods represented in the flowcharts of FIGS. 3 through 11 may be represented by the user interfaces shown in FIGS. 12 through 31.

In order to operate such an example system, an initial step may include opening the application on, for example, a computing device, such as one of the computing devices described above with reference to FIG. 1. Opening the application may include entering in log-in information such as username, password, or other credentials. An operator may select amongst opening a new case, opening an existing case, or opening an archived case. Once the application is opened, the user may carry out steps related to importing a digital model of a person's teeth at step 1 of the step bar 1205 shown across the top of the screen in FIG. 12. As part of importing the digital model, the operator may be prompted to select what type of impression scanner (i.e., intra-oral scanner) was used to create the digital model. A list may be available for the operator to select among various options the impressions scanner. The user may also be prompted to confirm whether the orientation of the digital model displayed on the user interface in a panel 1215 has a correct orientation, such as an orientation illustrated in a panel 1210 at the left side of the screen shown in FIG. 12. The user may also be prompted to confirm that the digital model shown on the user interface matches known records for a patient.

If the orientation of the digital model is not correct (i.e., does not match the image shown in the panel 1210 of the screen), the user may select, for example, an edit link. Selecting the edit link initiates a display of various options for the user in the panel 1210 to select among to change the orientation of one or more aspects of the digital model (e.g., the mandibular or maxillary arch, or both the mandibular and maxillary arch). The user may confirm that the orientation is correct. If the operator identifies that the digital model does not match known records for the patient, the operator may select a separate link (e.g., a "change files" link) that takes the operator back to a location in the file storage structure to select a different digital model file.

Figure 13:
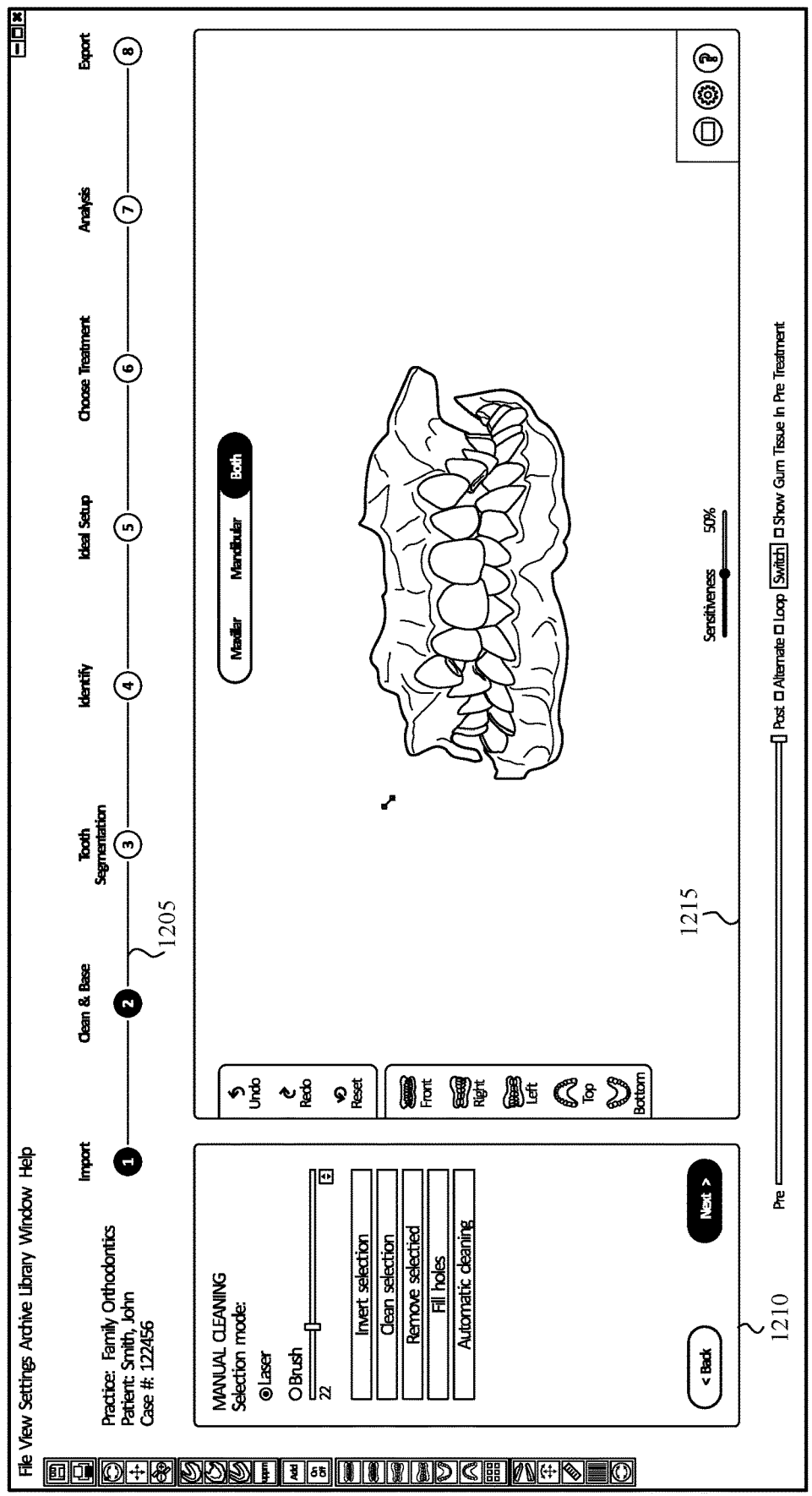

Once the operator confirms the correct orientation and correct file as part of the importing step 1, the treatment system automatically moves to step 2, which relates to cleaning the digital model. Moving to step 2 may automatically initiate a mesh cleaning algorithm. While the cleaning algorithm is running to clean the digital model, the user interface may display a notice that a mesh cleaning code is operating to repair and clean the digital model including, for example, adding simple bases to the maxillary and mandibular arches. Once the mesh cleaning algorithm is completed, the digital model appears in the panel 1215 of the user interface as shown in FIG. 13. The panel 1210 of the user interface may include an inquiry for the operator confirming that the digital model in the panel 1215 has an appearance that looks similar to a digital model shown in the panel 1210. If the digital model does not look like the model in the panel 1210, the operator may select a link related to editing the digital model. If the link is selected, a tool bar appears in the panel 1210 with features that permit the operator to adjust, for example, the base height and/or removing the excess material that is not wanted.

Figure 14:
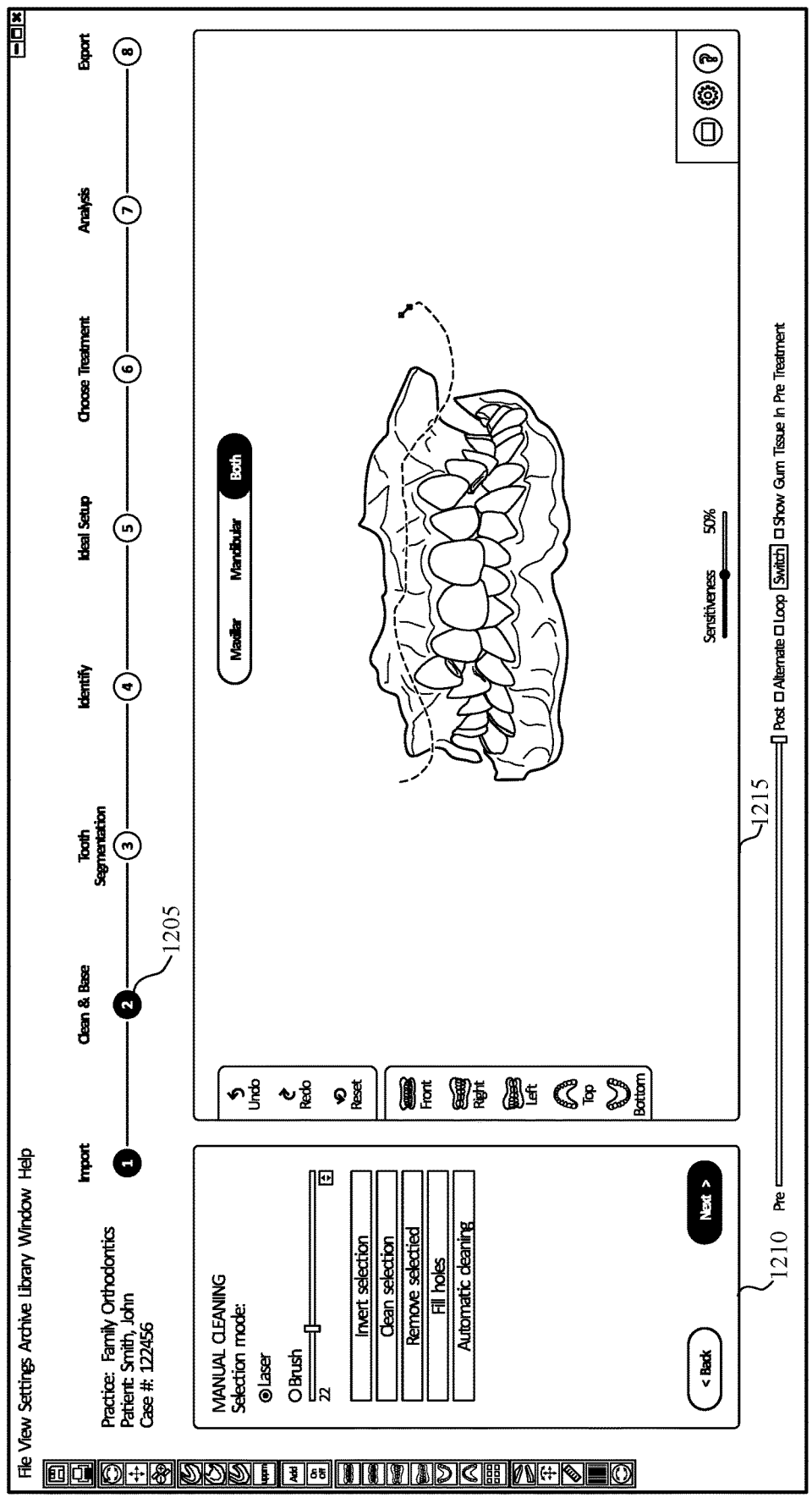

In the example of FIG. 14, several manual cleaning options are illustrated that may be available to the operator in the panel 1210. The first example is a "lasso" type selection mode in which the operator draws a line around or across a portion of the digital model that should be highlighted, as shown in part by the line drawn across the top portion of the model shown in FIG. 14. A "brush" cleaning mode may be selected in which a brush-type indicator appears on the screen that the operator can move across portions of the digital model to highlight those portions. The operator may then select among various options, whether using the lasso or brush modes, to insert a selection, clean a selection, remove a selection, fill voids or holes, or initiate additional automatic cleaning. The mesh cleaning algorithm can be operated multiple times, such as after any manual cleaning operation is performed.

Figure 15:
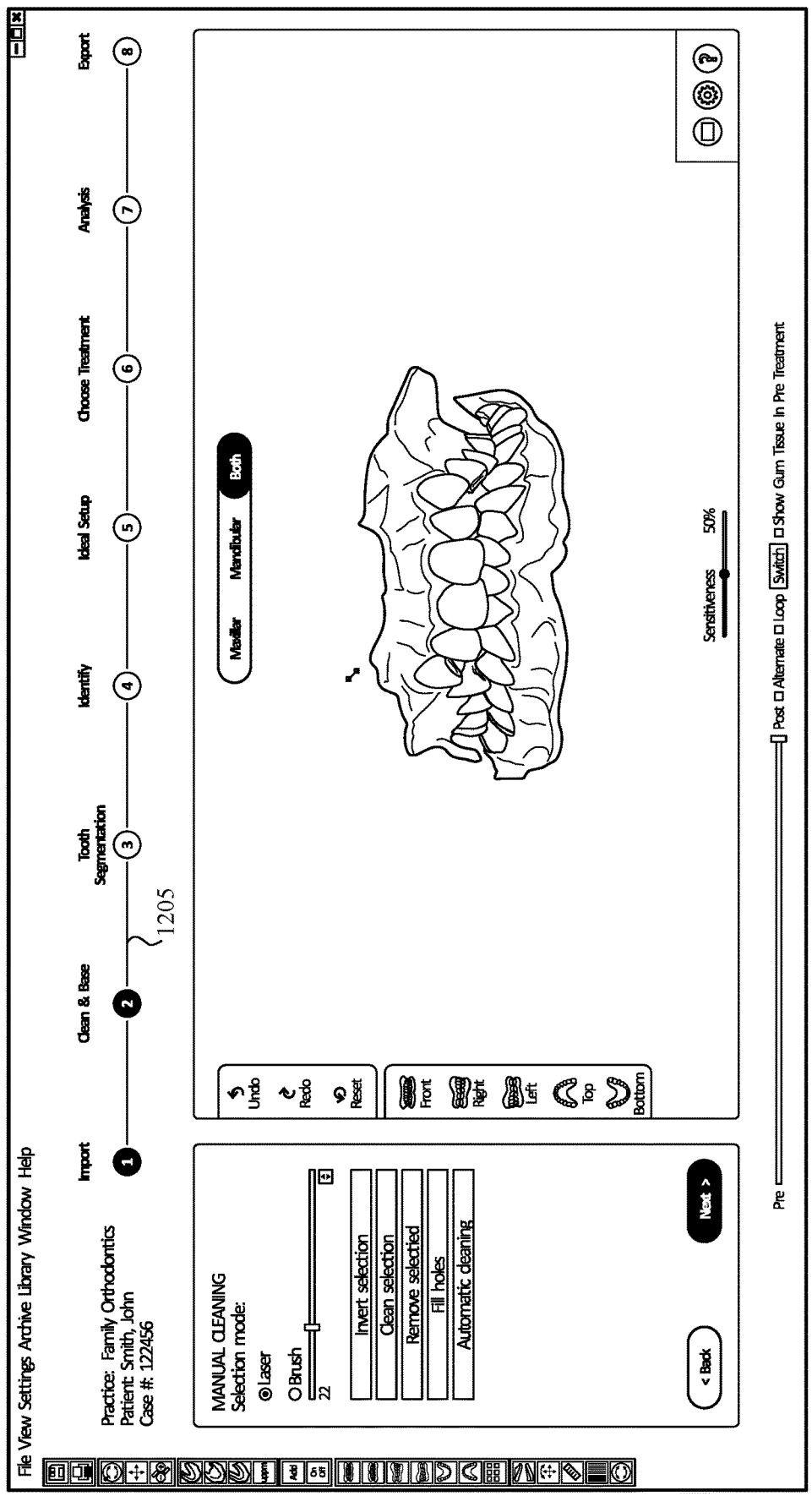

In the example of FIG. 15, a modified version of the digital model shown in FIG. 14 is illustrated after removing the upper part of the digital model that was selected previously using the "lasso" selection mode. FIG. 15 also shows various adjustment features in the panel 1215 that are available for changing the view of the digital model between front, right, left, top, and the bottom views. The user interface shown in FIG. 15 may also include undo and redo tabs, as well as reset selection options. Once the digital model has been cleaned to the operator's satisfaction to remove excess material or data from the digital model, the operator may use the "next" button shown in FIG. 15 to move to the step 3.

Figure 16:
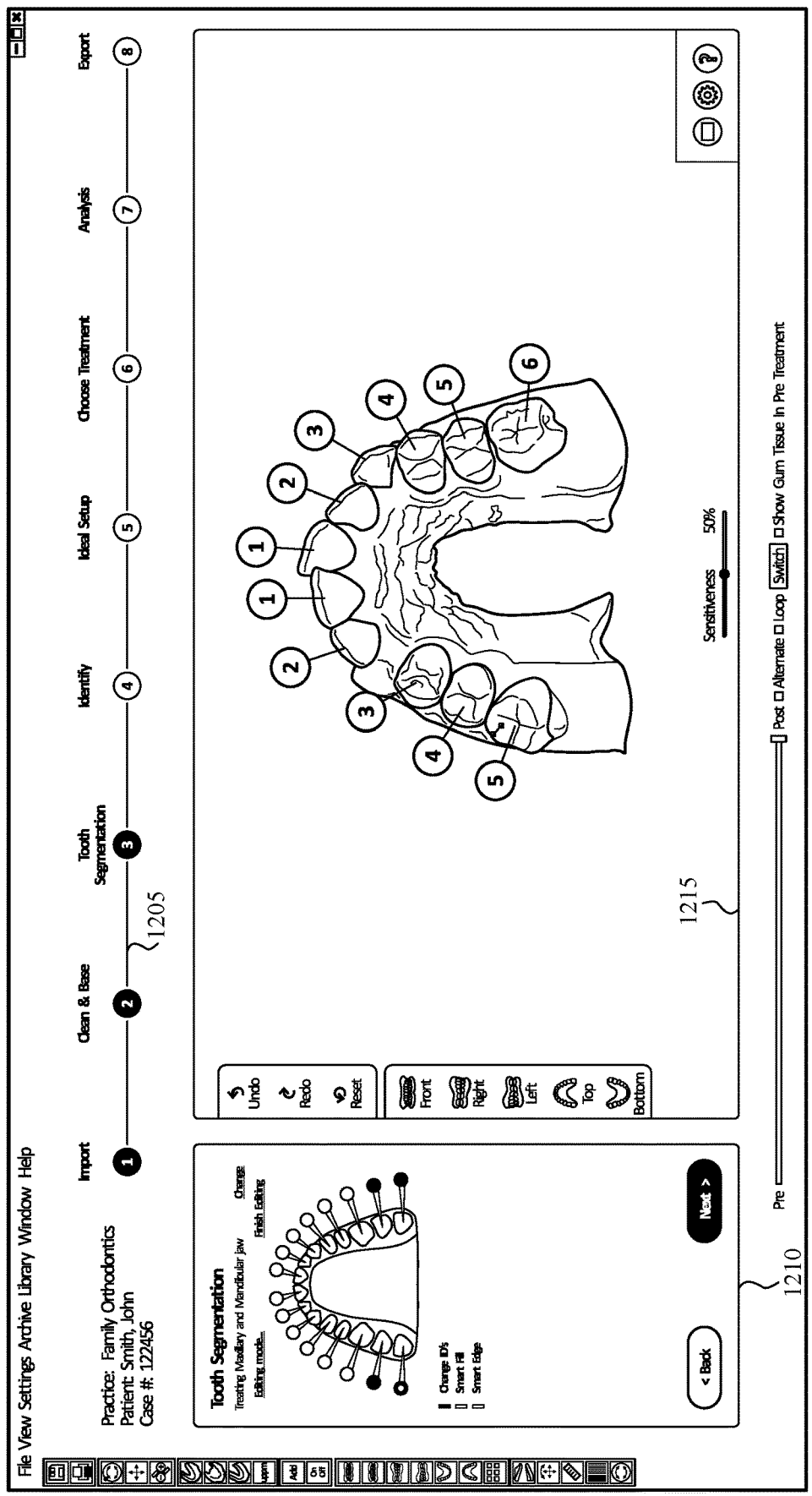

FIG. 16 illustrates the user interface associated with a segmentation step. The segmentation step may include automatically operating a segmentation algorithm in which individual teeth of the digital model are identified and the gum tissue from the digital model is detected separate from the teeth. One aspect of initiating the segmentation algorithm is prompting the operator to select whether the segmentation is performed on the maxillary arch or the mandibular arch, or both. Once the segmentation algorithm is complete, the digital model is displayed on the user interface. The user is prompted to confirm whether the teeth of the digital model have been segmented correctly. In some examples, one or the other of the maxillary arch and the mandibular arch are displayed at a time on the user interface, starting with the maxillary arch if both arches have been segmented. A smaller image in the panel 1210 of the user interface may illustrate a maxillary arch with all the teeth segmenting correctly for the operator's benefit to compare to the digital model. The operator may be provided with the option of editing the digital model if the segmentation does not appear to be correct. The user interface may include a plurality of selectable items for rotating and/or viewing the digital model in different views, as well as zooming in and out to better observe the boundary between individual teeth and between the teeth and gum tissue.

The segmenting algorithm may also result in labeling each of the teeth of the digital model as shown in FIG. 16 with a numeric indicator. Part of editing the digital model may be editing the numerical indicators. The operator may be provided with a number of editing options in the panel 1210 as shown in FIG. 16. For example, the user may select between changing indicators for the individual teeth, the fill option in which selected portions of the digital model can be filled to indicate teeth, and a boundary modifying option that permits the operator to move the boundary between the adjacent teeth, around a given tooth, or between the tooth and gum tissue.

Figure 17:
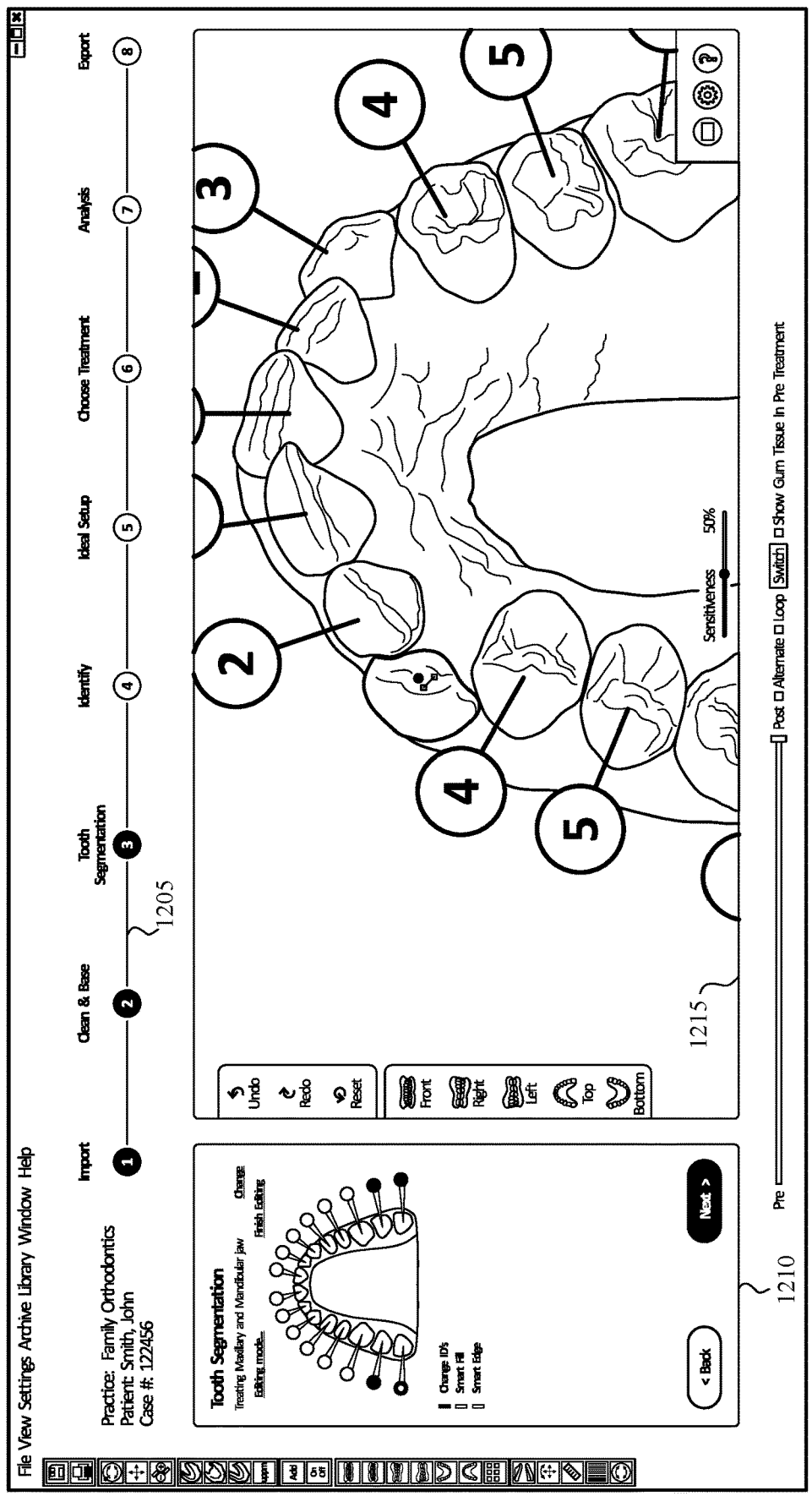
Figure 18:
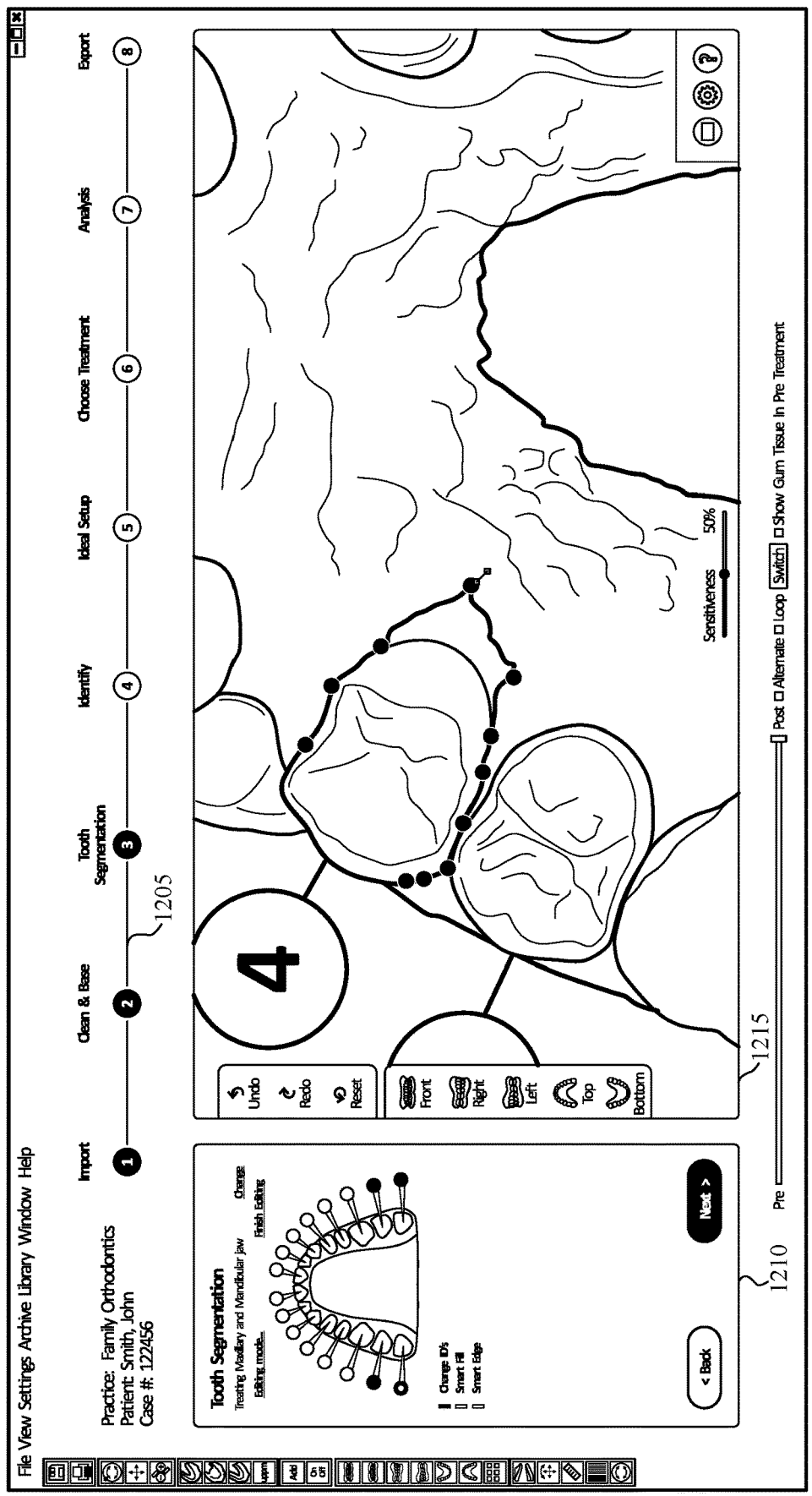
Figure 19:
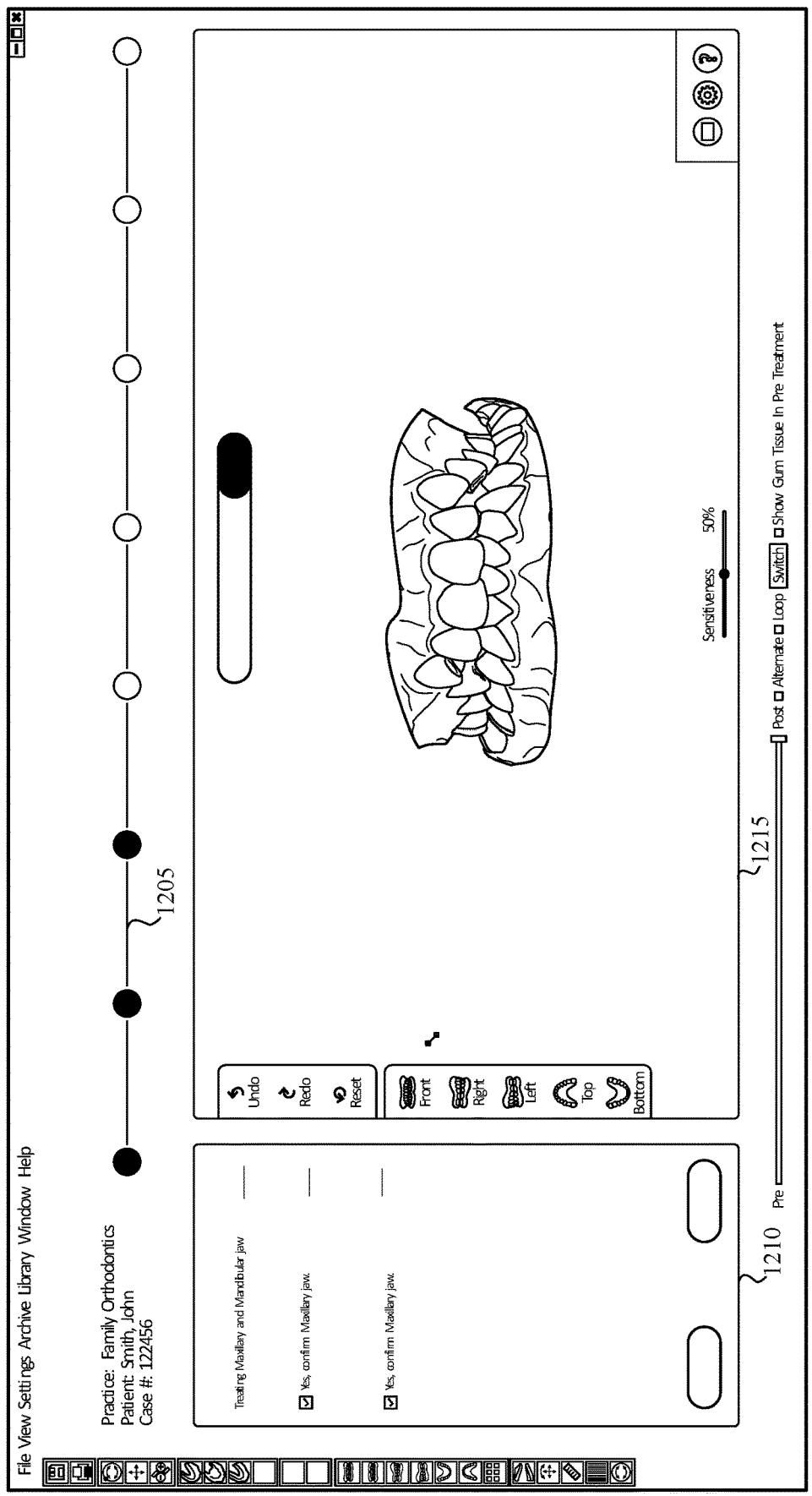

FIG. 17 shows an edit option in which a previously unselected tooth has been selected by the operator so as to be identified as a tooth in the digital model. Once the tooth is identified, the operator may go back to the identification modifier option and add a numerical indicator for that tooth. The operator may also select the boundary edit feature to adjust a boundary of the newly identified tooth. FIG. 18 illustrates the boundary editing tool, wherein the boundary of a tooth is highlighted with markers and a boundary line. The operator here may move the boundary markers to adjust the boundary of the tooth. Once the operator has completed editing of the segmentation, the operator may be prompted to confirm that all the teeth of the maxillary model have been segmented correctly, and/or that all of the teeth of the mandibular model have been segmented correctly, as shown in FIG. 19. Once these confirmations have been entered, the operator may select to move onto to step 4.

Figure 20:
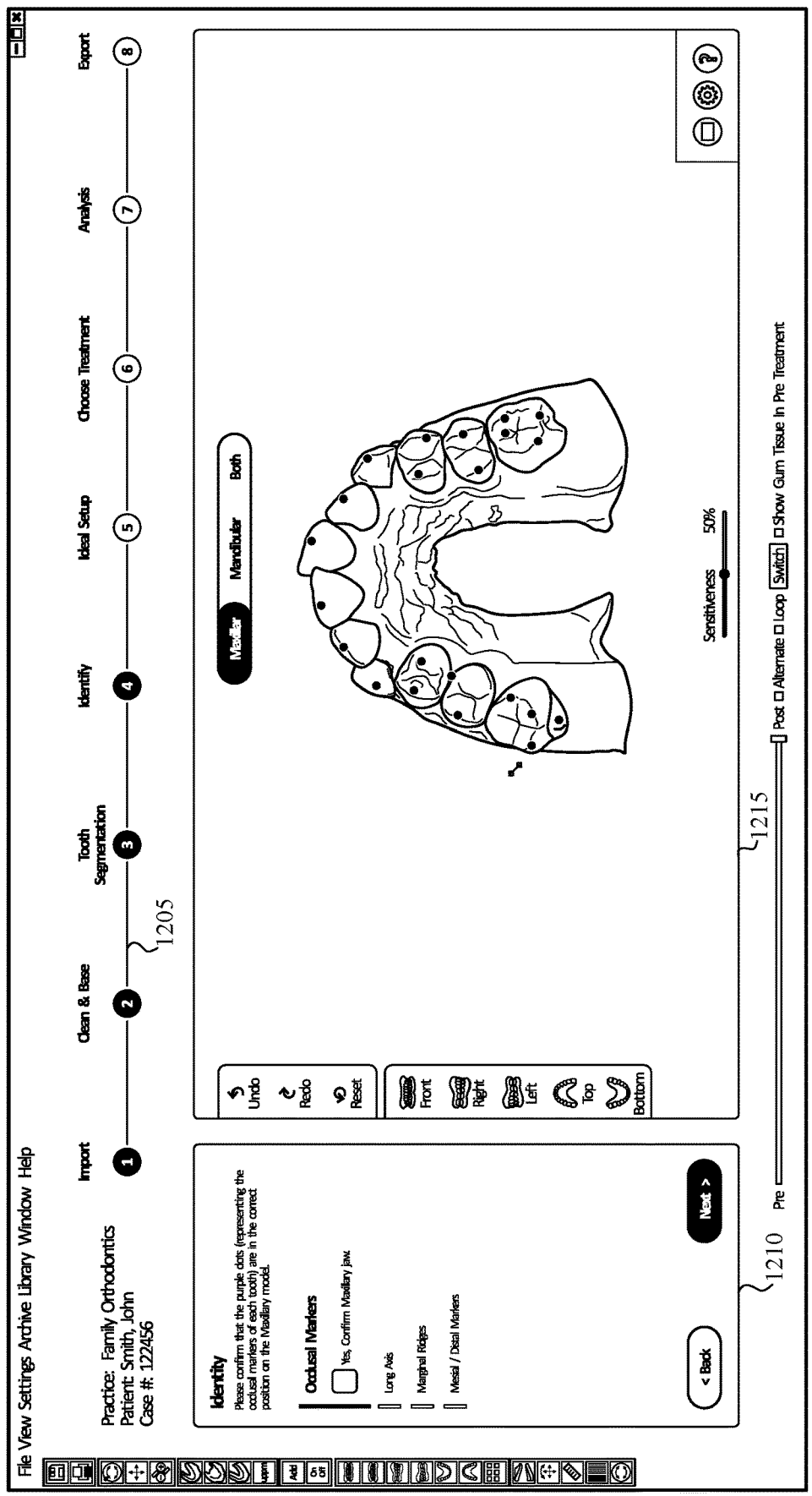

Advancing to step 4 may initiate an identification step for the features of the teeth of the digital model. The identification may occur automatically by operating an identification algorithm, which identifies certain teeth features with markers and various views of the model. The operator may be put on notice while the identification algorithm is operating. Once the algorithm is complete, the digital model is displayed on the panel 1215 of the user interface with a plurality of markers thereon as shown in FIG. 20. FIG. 20 shows a plurality of occlusal markers identified on the individual teeth of the digital model. The occlusal markers may represent the tips of the individual teeth (e.g., molar including multiple tips and other teeth including a single tip). If any of the occlusal markers appear to be incorrectly positioned, the operator may be given the option to edit the position of the markers. The editing may include selecting a marker and moving it into a correct position. The markers may be visible in different views of the digital model, wherein different views may be selected from options available on the user interface.

Figure 21:
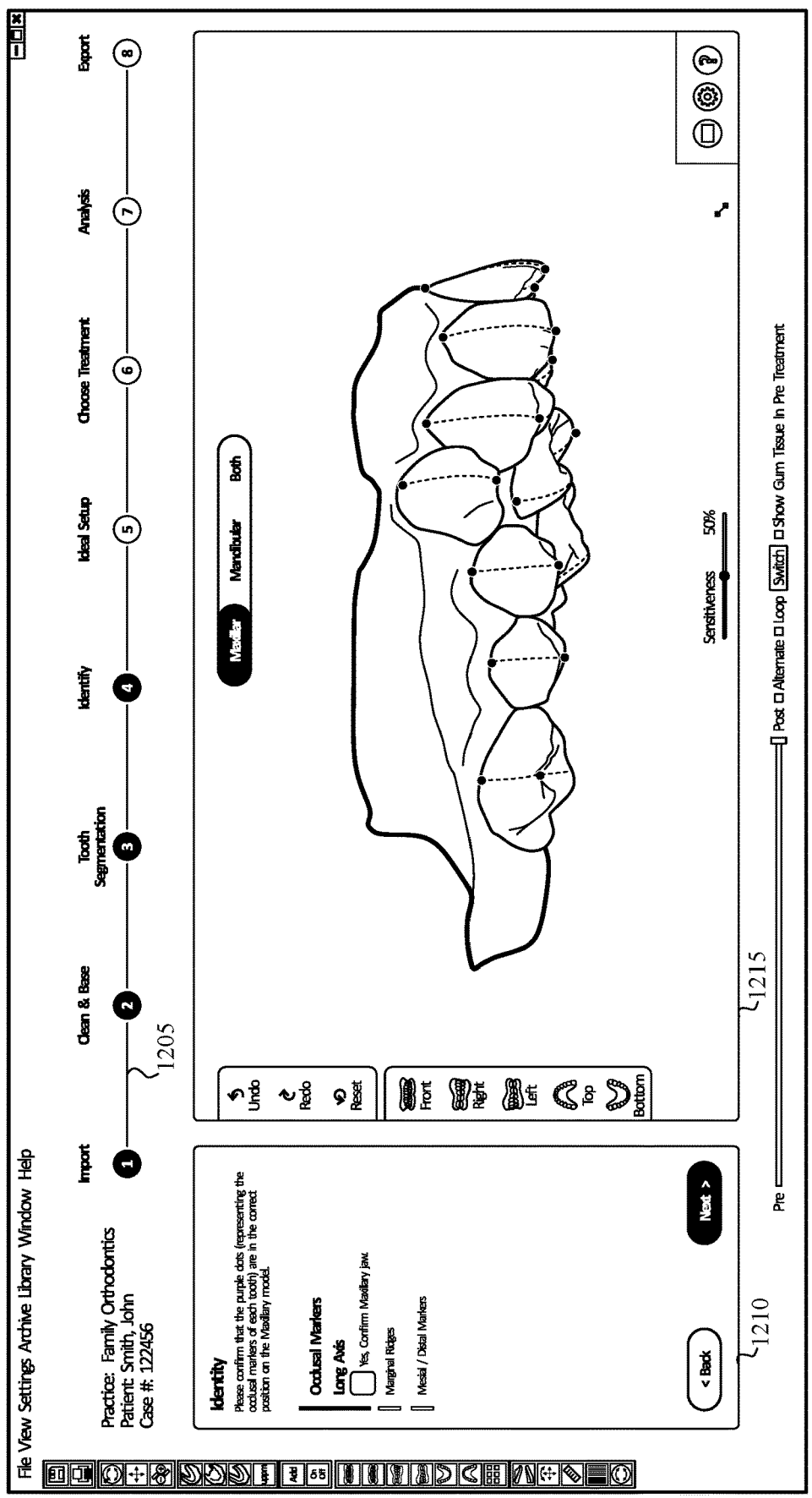
Figure 22:
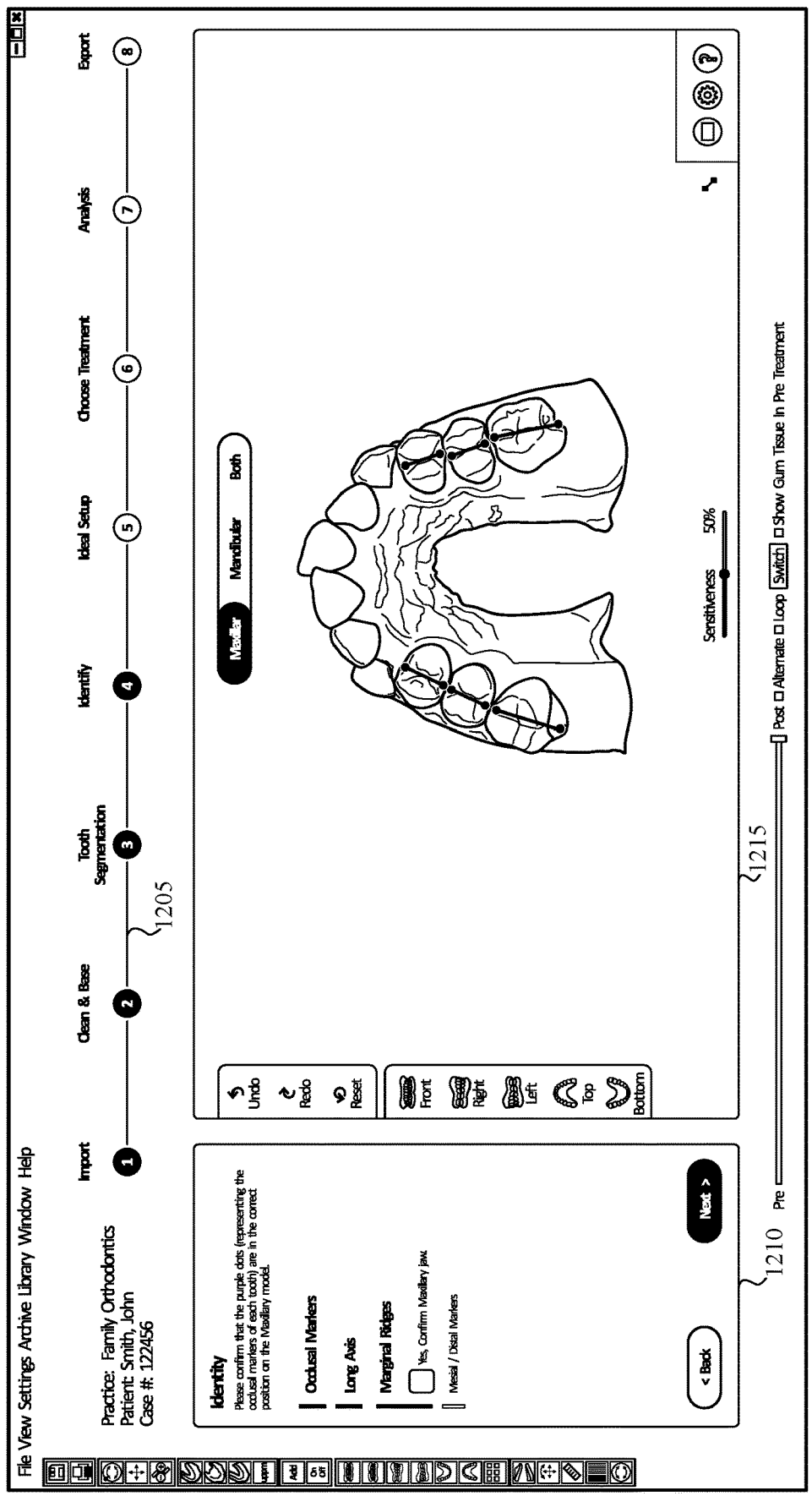

FIG. 21 illustrates a plurality of long axis markers or indicators provided on each of the teeth. The operator may edit the location of the long axis markers and may view the long axis markers in different views of the digital model. The long axis marker is aligned with the length dimension of the tooth along a general center line across a width of the tooth. The long axis indicator is visible on the front (facial), outward facing surface of the teeth, and may also be visible on the rear (lingual), inward facing surface of the teeth. FIG. 22 illustrates the marginal ridges markers on the molars of the digital model. The operator may be given the option of editing the position of the marginal ridges, as well as viewing the marginal ridges from different views of the digital model. The marginal ridge is arranged between the inner (distal) and outer (mesial) tips of the molars. The marginal ridge identifies a centerline or midline between the outer and inner halves of the molars.

Figure 23:
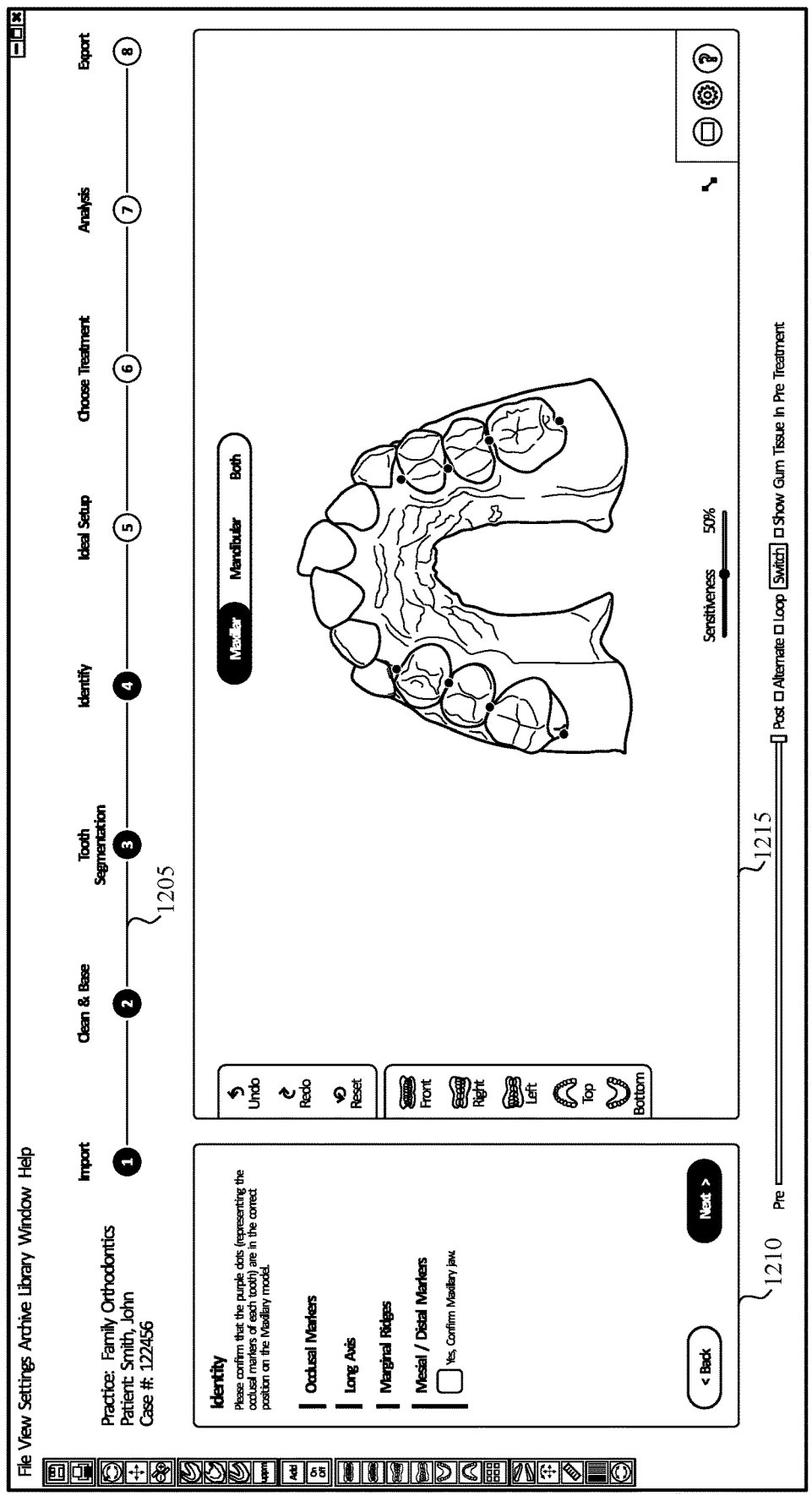

FIG. 23 shows the mesial/distal markers generated as a result of the identification algorithm. The operator may be given the option of adjusting the position of the mesial/distal markers, as well as view the markers in different views of the digital model. The mesial/distal markers may represent the mesial or facial surface and the distal or lingual surface boundaries of the teeth as viewed from the bottom view shown in FIG. 23. With each of the long axis, occlusal, marginal ridges, and mesial/distal markers described with reference to FIGS. 20 through 23, the operator may be prompted to confirm that the markers are accurate before being able to move on to view and/or adjust the markers. Furthermore, the operator may be provided with an image illustrating the correct position of a marker in, for example, the panel 1210 of the user interface so the operator has an idea of what adjustments might be needed for the markers on the digital model.

Figure 24:
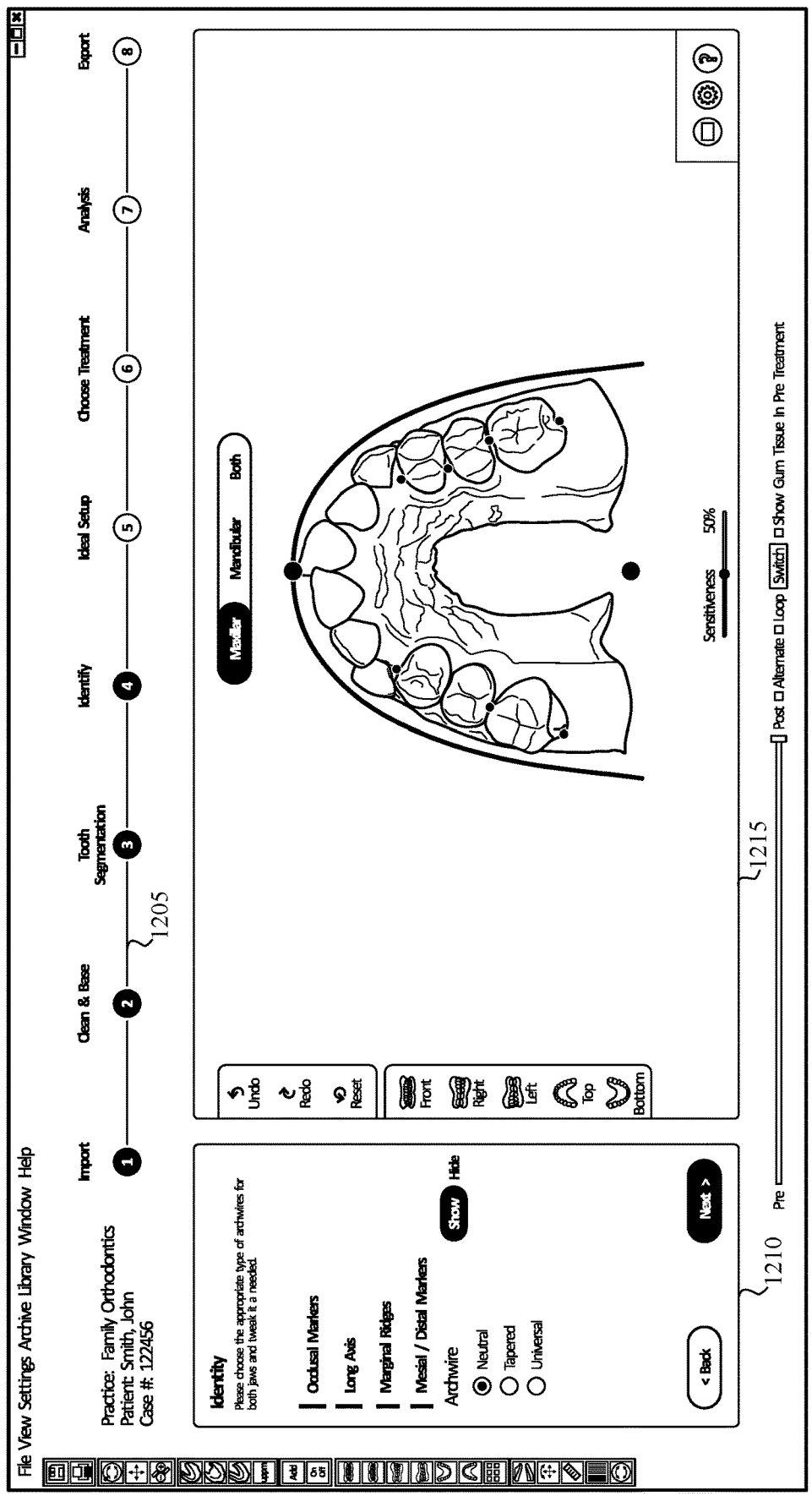

Once all of the markers have been confirmed to be accurate by the operator, the operator may select an arch wire form as shown in FIG. 24. Multiple arch wire shapes may be presented to the operator in the panel 1210 of the user interface as shown in FIG. 24. Several example arch wire forms include natural, tapered and universal. The natural arch wire form is shown adjacent to the digital model in FIG. 24. The operator may be given the option of adjusting a position of the arch wire relative to the digital model. The arch wire that most closely matches the natural arch shape of the given maxillary or mandibular arc shown on the user interface is selected. The arch wire for each of the maxillary and mandibular arches may be separately selected. The same arch wire form selected for the maxillary jaw will be used for both the upper and lower arch wires. In some examples, the shape of the arch wire may be editable as well as the position of the arch wire relative to the digital model.

Figure 25:
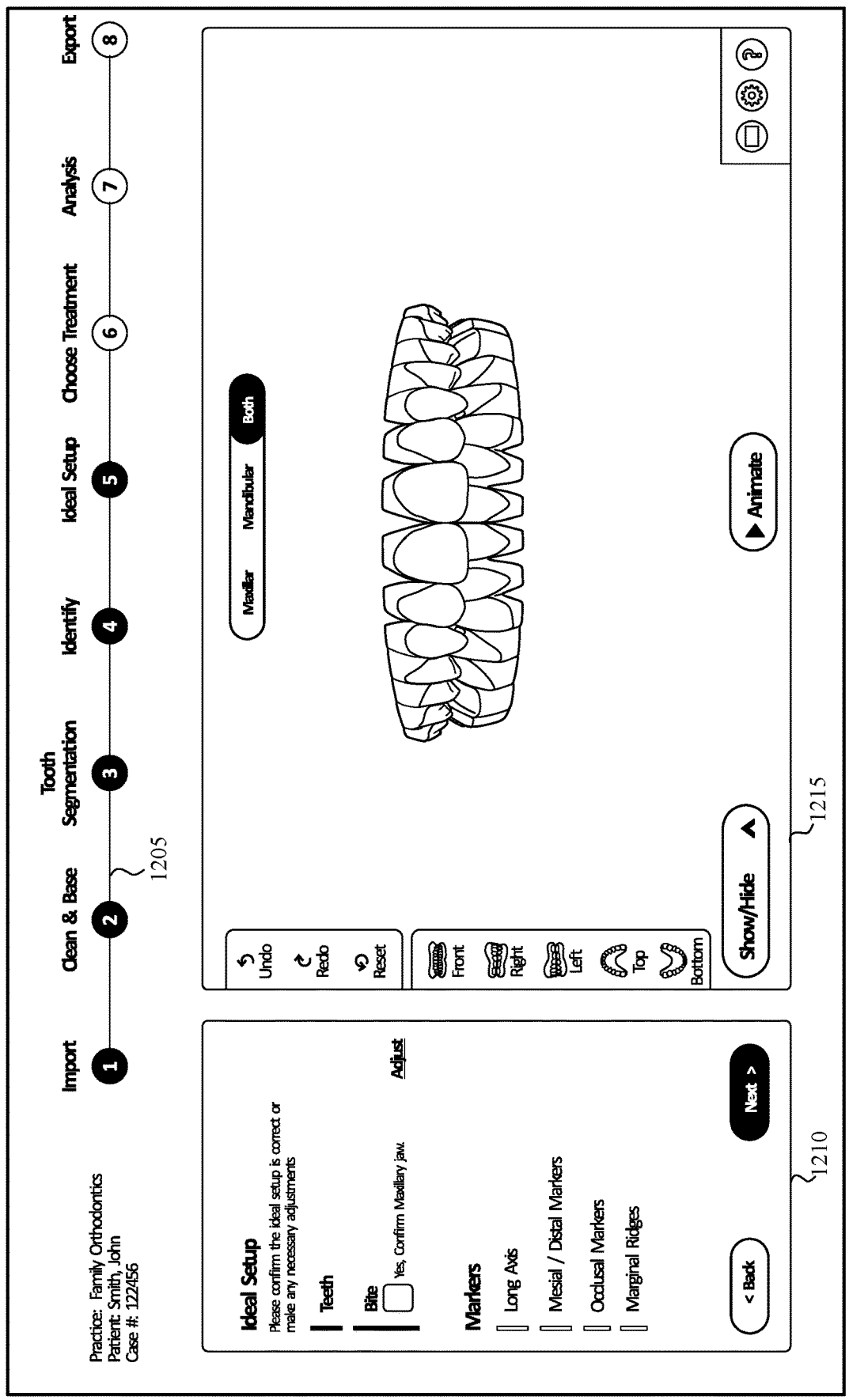

Once the arch wire is selected for the digital model, the operator may be prompted to move to step 5 related to creating an ideal setup of the teeth for the digital model. FIG. 25 illustrates a user interface associated with the ideal setup step. Once the operator progresses to step 5, an ideal setup algorithm operates automatically to adjust the position of the teeth relative to each other into an ideal or recommended orientation for the teeth in the maxillary and mandibular arches as well as the relative orientation between the maxillary and mandibular arches (i.e., bite). The operator may be put on notice that the ideal setup algorithm is operating until the ideal setup orientation is displayed in the panel 1215 of the user interface as shown in FIG. 25. The creation of the ideal setup may include moving the individual teeth side-to-side, up and down, front to back, and various rotated directions. The rotated directions may include: tip in angulation or roll (i.e., looking directly at the face of a tooth and rotating clockwise/counterclockwise), torque in incline and procline, buccolingual, or pitch (i.e., looking directly at the biting surface of a tooth and rotating clockwise/counterclockwise), and rotation in yaw (i.e., looking directly from the side of a tooth and rotating clockwise/counterclockwise).

Figure 26:
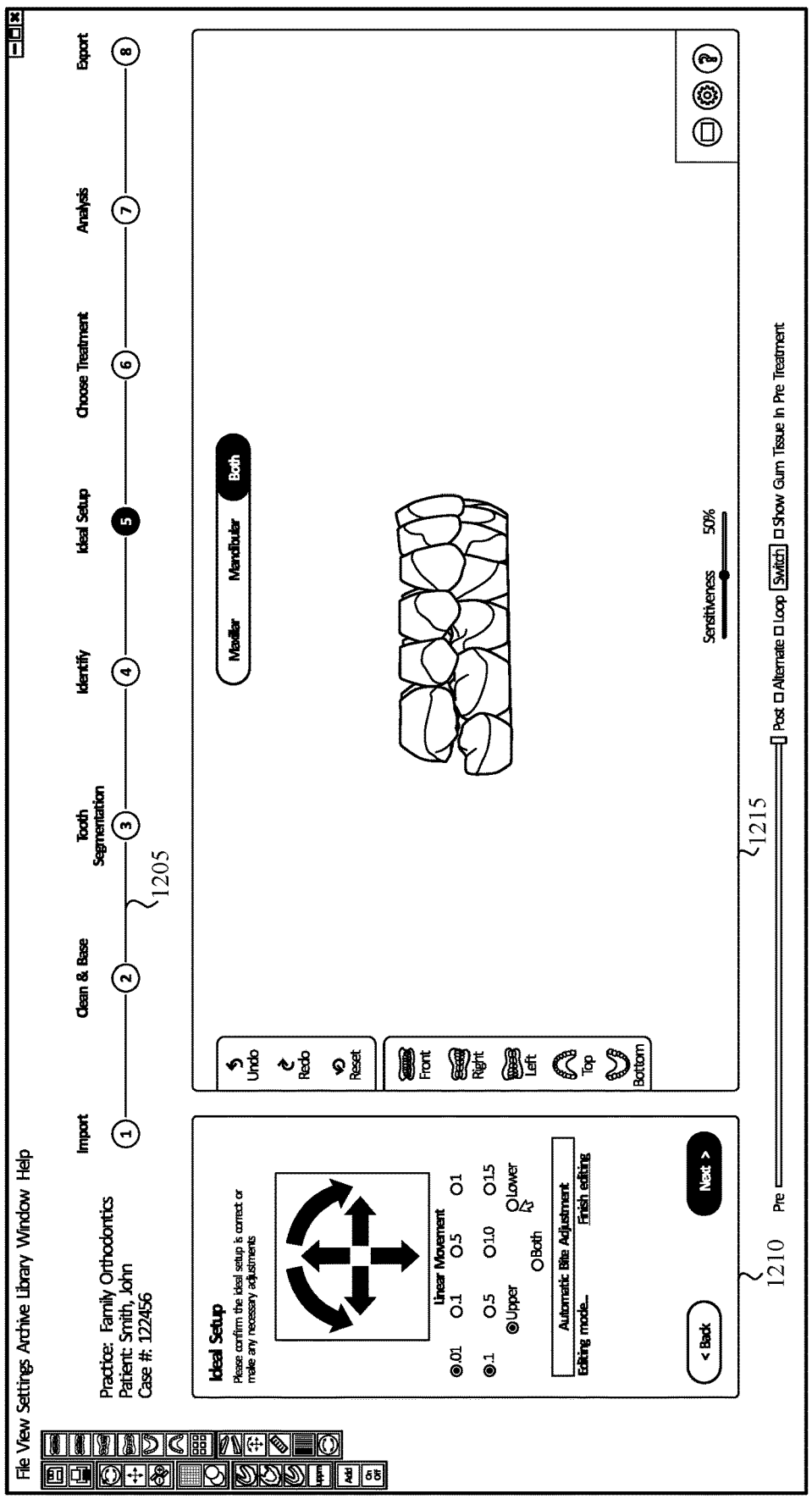

The operator may be given the option of adjusting the position of each individual tooth as well as the bite or relative position between the maxillary and mandibular arches. Selecting either editing of the individual teeth or the bite may generate access to an adjustment toolbar in the panel 1210 of the user interface. Such an adjustment toolbar for bite adjustment is shown in FIG. 26. The operator may move the digital model into different orientation so as to better view the relative position between the maxillary and mandibular arches during the bite adjustment. Similar change of views may be possible while making the adjustments to any individual tooth for either the maxillary or mandibular arches. The operator may also be given the option of reviewing the markers generated during the identification step 4. The operator may adjust the position of any one of the markers and then rerun the ideal setup algorithm to determine a see whether the changes result in an improved ideal setup orientation of the teeth and/or bite. After completing adjustments of the individual teeth of the maxillary and mandibular arches and completing the bite adjustments, the operator may be prompted to confirm that the adjustments are complete. The operator may be given the option of advancing to step 6. The ideal setup may be referred to as a finalized ideal setup, a finalized recommended orientation or setup, an adjusted ideal or recommended setup or orientation, or the like.

Figure 27:
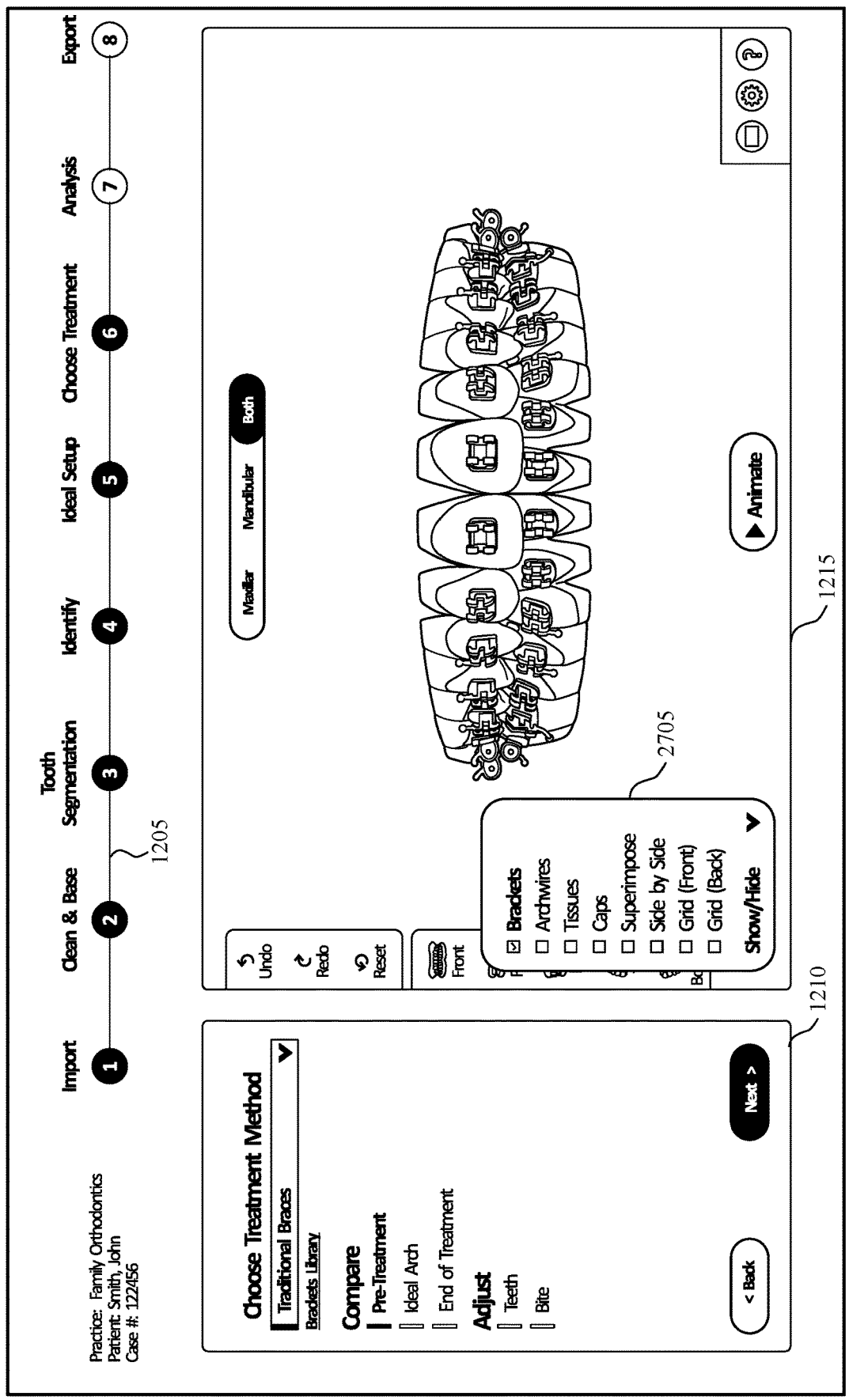

The operator is given the option of advancing to step 6 related to selecting an orthodontics treatment. FIG. 27 illustrates a user interface associated with step 6. The ideal setup of the teeth generated in step 5 may be displayed in the panel 1215 of the user interface as shown in FIG. 27. Various treatment options such as, traditional braces, custom braces, aligners, and hybrid treatment may be presented in the panel 1210. Once a treatment method is selected by the operator, the system automatically positions brackets on the teeth of the ideal setup as shown in FIG. 27. Other options may be presented in a menu 2705 related to the selected treatment method including, for example, showing one or more of the arch wires, tissues, caps, superimposed, side-by-side, grid (front), and grid (back). The positioning of the treatment features relative to the teeth of the ideal setup may occur based on one or more algorithms.

The operator may be given the option to turn the display of the brackets and other treatment features on or off. The operator may also be given the option of selecting among various views of the digital model. For example, the operator may select a post-treatment view of the digital model based on use of the selected treatment method. The operator may select a pre-treatment view of the dental model. Another option may to be to view two or more of the pre-treatment, post-treatment, and ideal setup views of the model in a side-by-side or superimposed arrangement so that the operator can compare the digital model in those different orientations with the brackets and other treatment features viewable or removed. In at least some examples, brackets, arch wires, aligners, or other features associated with a treatment method which intersect, interfere or otherwise appear to be inaccurately placed may be automatically highlighted for review by the operator. Such a notification may also be made to the operator if there is a gap or disconnection between otherwise intended to be engaged features.

Figure 28:
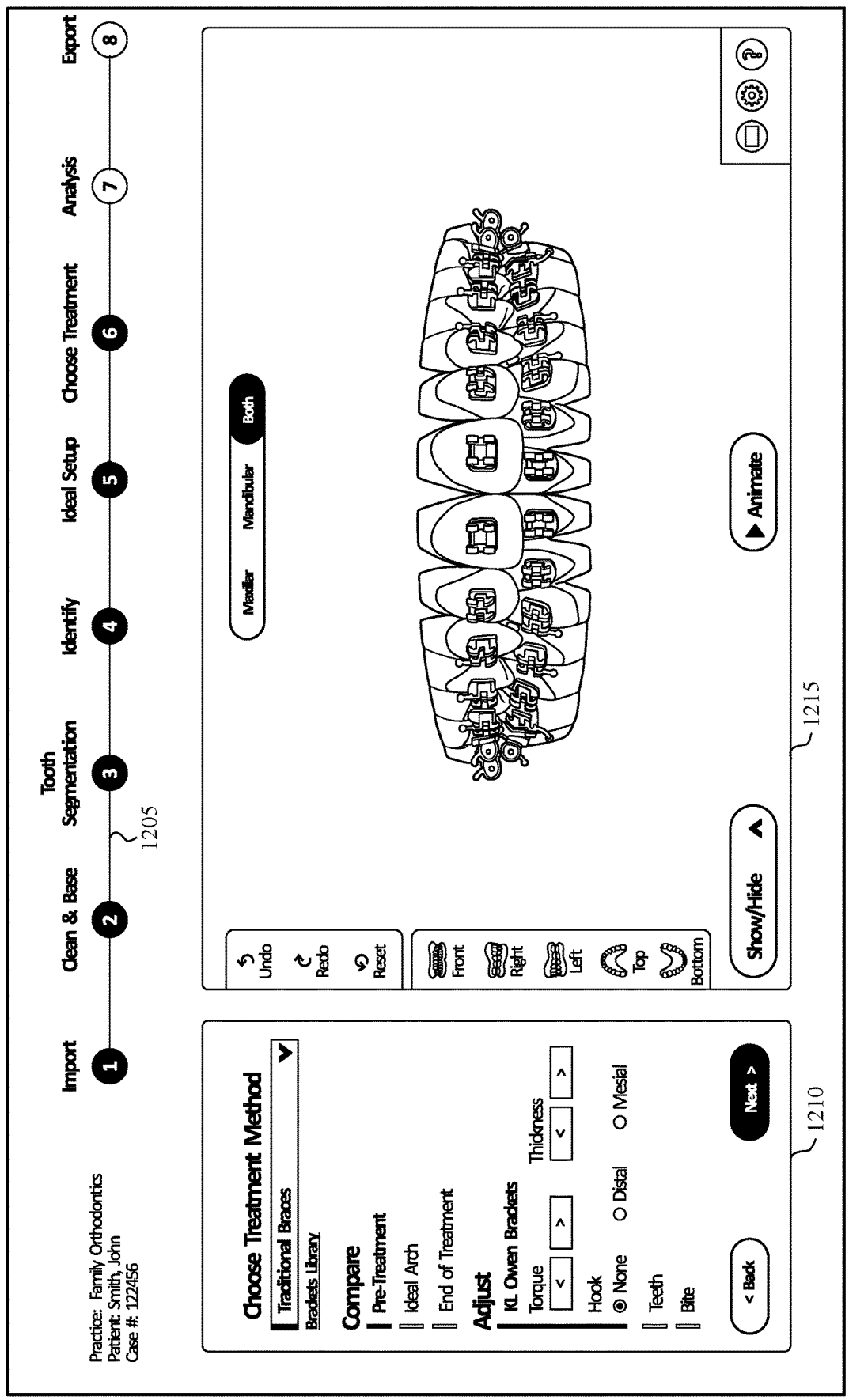

FIG. 28 illustrates a custom braces treatment method, such as KLOwen brand custom braces and related brackets, manufactured by KLOwen of Fort Collins, Colo. The use of custom braces may result in more accurate and precise movement of the teeth from the pre-treatment orientation to a desired post-treatment orientation that is closest to the ideal setup, and/or reduce the treatment time, amount of wire bending during treatment, etc. With any of the treatment methods selected, the operator may be given the option of adjusting the position of the brackets or other treatment features. FIG. 28 shows adjustment options in the panel 1210 of the user interface that are specific to the KLOwen brand of custom braces. Other types of custom braces may include customized adjustment features unique to that brand. Some adjustment features may be common to all types of treatment methods.

After adjusting the position of the brackets or other treatment features, the operator may select a view of the digital model that is post-treatment based on the selected treatment method and adjustments to the bracket locations. This post-treatment orientation of the digital model may be compared to the ideal setup by toggling between the different digital model versions, positioning the digital models side-by-side, or other desired viewing options. The operator may continue to adjust the location of the brackets or other treatment features of selected treatment method until the post-treatment orientation of the teeth more closely matches the ideal setup orientation of the teeth. Many of the adjustment options available in the treatment selection step 6 can be further modified by going back to step 5 to change the ideal setup or going back to step 4 to move the location of markers.

The system reflected in the user interfaces of FIGS. 12 through 31 may provide an iterative process of making minor or major adjustments in order to obtain a post-treatment arrangement for the teeth that most closely matches a desirable ideal setup or orientation of the teeth. The algorithms available in the system provide for a relatively fast and smooth transition between the various steps while integrating adjustments and providing numerous viewable versions of the digital model to assist in this iterative process.

Figure 29:
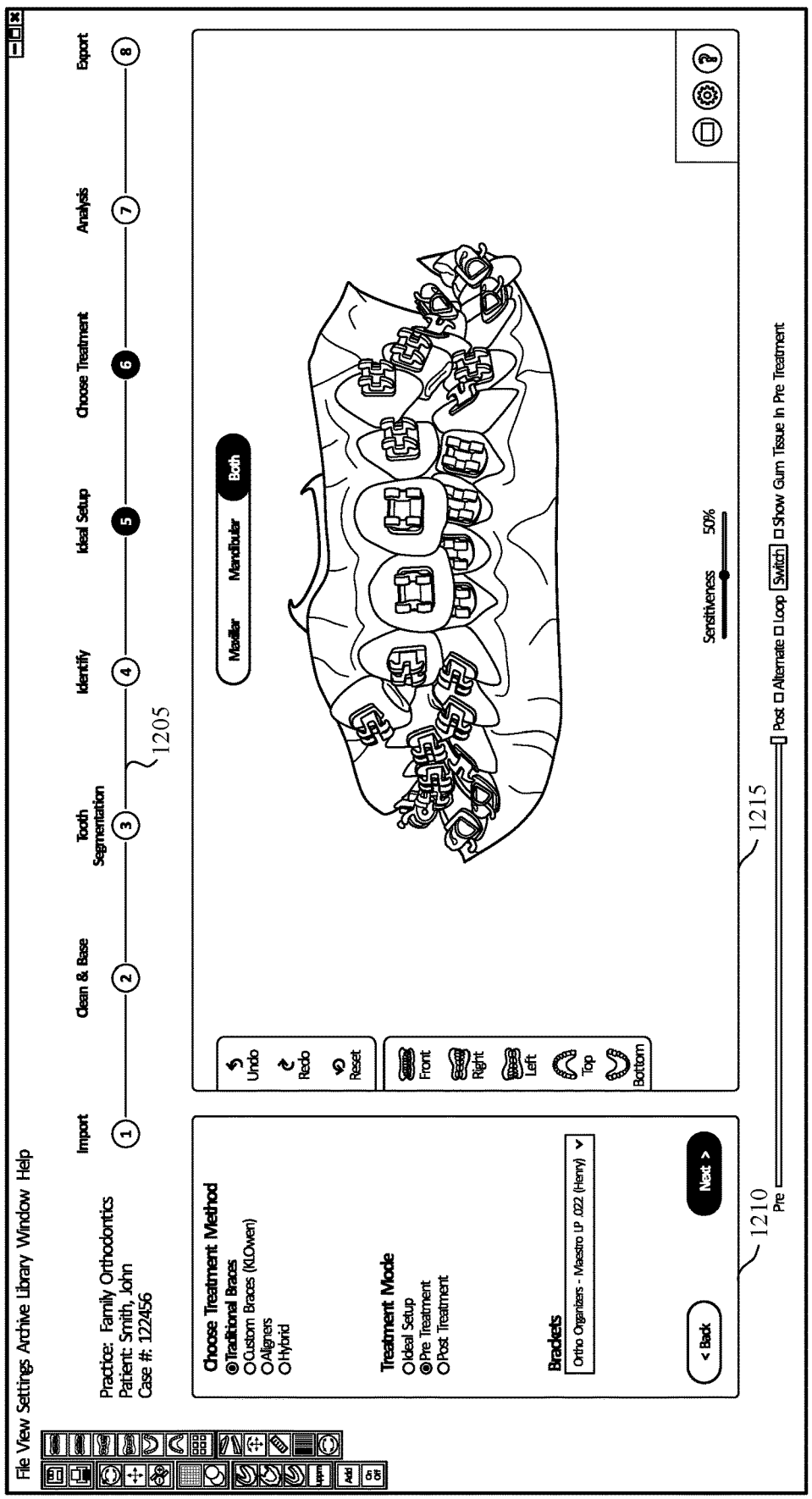

Once the operator has finalized adjustments as described above with reference to FIGS. 27 and 28, the operator may be given the option of progressing to step 7 as shown in FIG. 29. FIG. 29 shows the pre-treatment digital model with the brackets mounted thereon at locations that should result in a post-treatment arrangement of the teeth that closely matches the ideal setup established in the previous steps. FIG. 29 illustrates some of the overlaps, interferences, and the like that may correspond to adjustments before moving on to step 7.

Figure 30:
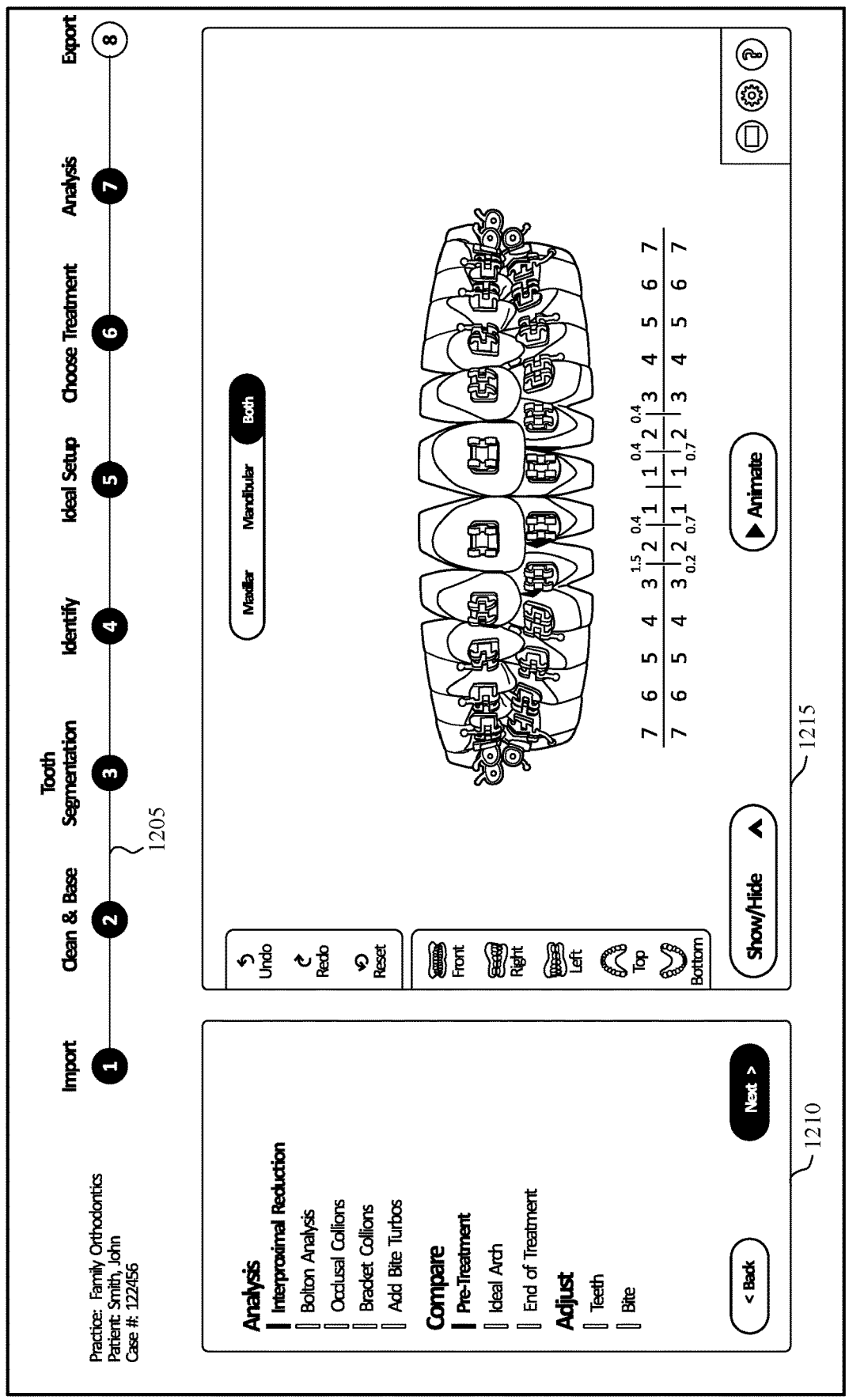

Once the operator chooses to advance to step 7, the user interface displays the ideal setup with the treatment method applied thereto in the panel 1215 as shown in FIG. 30. The operator is provided with various tools in the panel 1210 to assist in the full treatment plan. For example, in the panel 1210 of the user interface, the operator may be provided with a list of tools including, for example, an interproximal reduction (IPR), which allows the operator to determine whether the teeth need to be "shaved" down on the sides in order for enough room to be available for the ideal arch. A Bolton analysis may assist the operator in determining whether there is enough room in the mouth to fit all of the teeth, or if expansion or extraction is warranted to complete the treatment plan. An occlusion collision analysis may include an illustration of whether the lower and upper arches are intersecting. If intersection is occurring, the doctor can adjust the bite to a better position. A bracket collision analysis shows the operator if the upper teeth will collide with any of the lower brackets. A bite turbo analysis may provide recommendations for placement of bite turbos where collisions are apparent, thereby preventing the upper teeth from damaging or dislodging any of the lower brackets, or vice versa.

Figure 31:
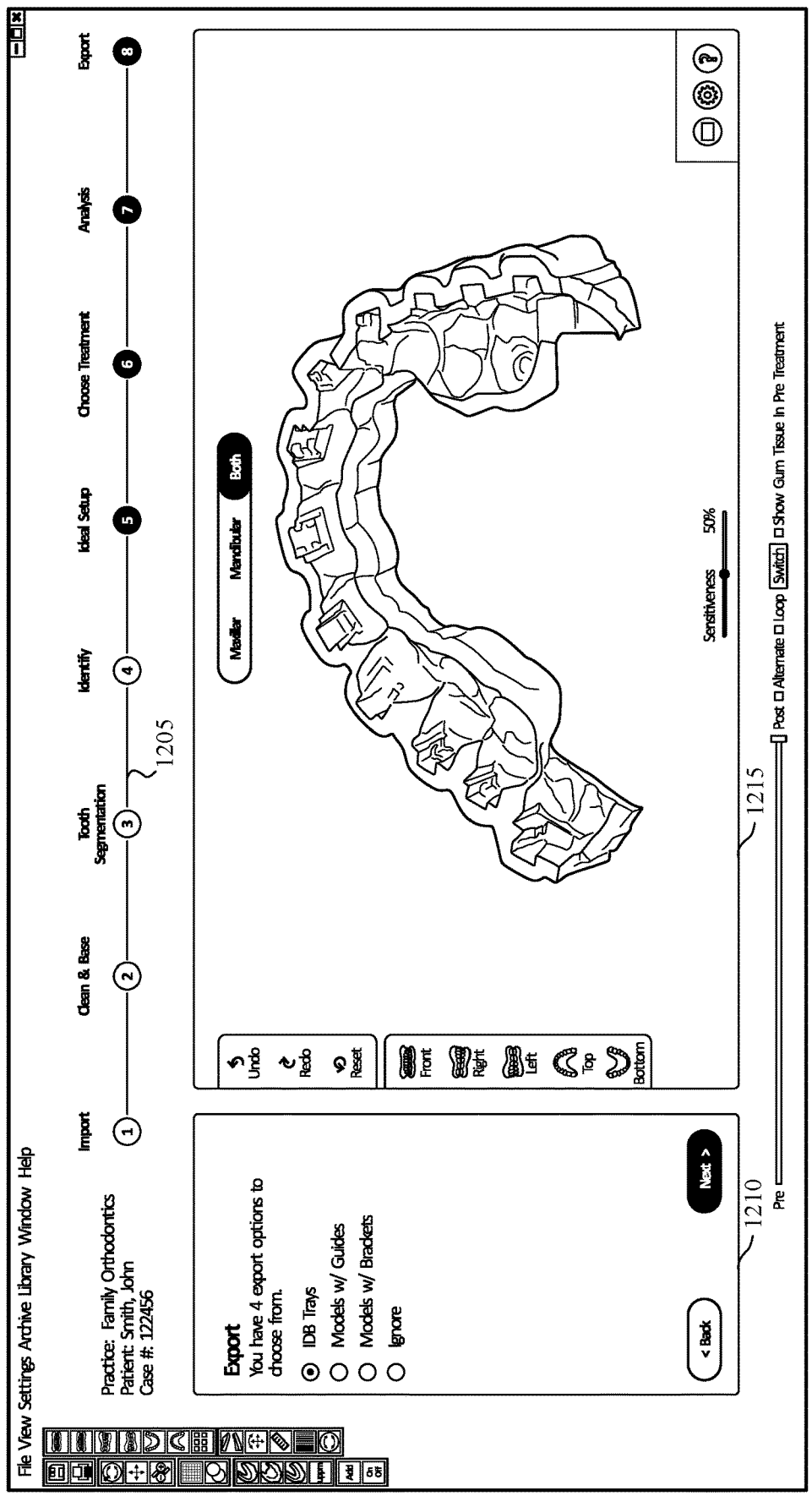

One or more of the analyses available at step 7 may be conducted for the pre-treatment, ideal arch, and end of treatment orientations for the digital model. The analysis step may also provide adjustment capabilities for the operator to adjust orientation of the teeth and/or bite. Completing any one of the analyses steps may result in the operator choosing to go back to one of the previous steps to make further adjustments as needed. FIG. 30 shows alignment features and highlights on the digital model or adjacent thereto as part of the analysis step (e.g., the IPR analysis). Once the operator has completed the analysis and determined a treatment plan to completion, the operator can move to step 8, as shown in FIG. 31. Step 8 relates to exporting a digital model of a bracket tray. The digital model may be used to form an actual bracket tray for use in mounting the brackets or other treatment features to the person's teeth. The export step shown in FIG. 31 may include generating the digital model and displaying the digital model on the user interface at panel 1215. The digital model of the tray includes bracket seats to receive the brackets of the treatment plan shown in FIG. 30. The tray may also include seats for interface with the teeth to which the brackets are to be mounted. The export step shown in FIG. 31 may include generating a digital model file that can be used by a model-forming device such as, for example, a 3D printer. Other model-forming devices may be used including, for example, injection molding.

Figure 32A:
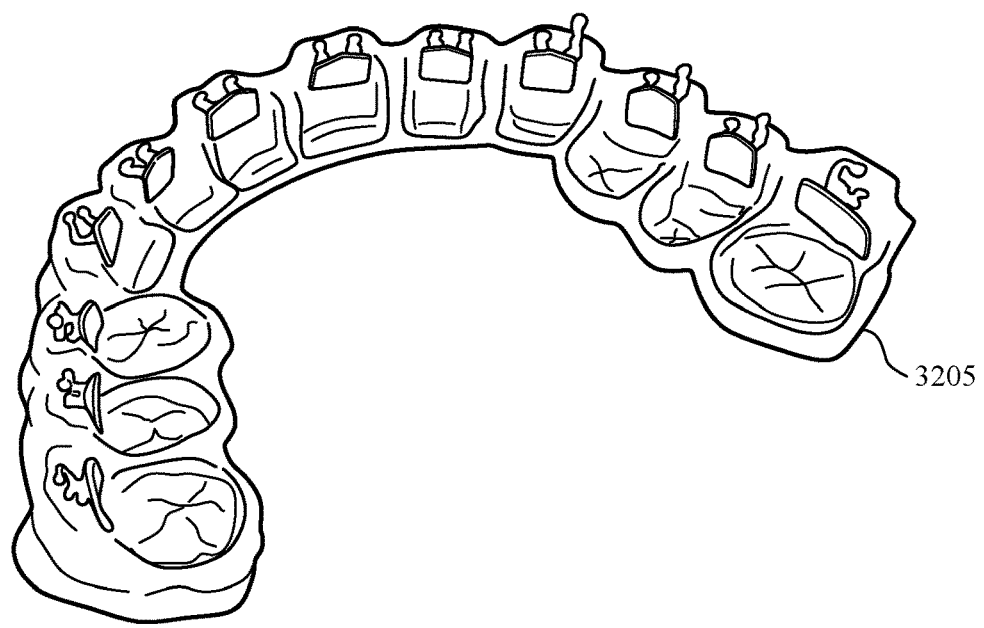
FIG. 32A illustrates an example of a formed bracket tray using a digital model in accordance with aspects of the present disclosure.
Figure 32B:
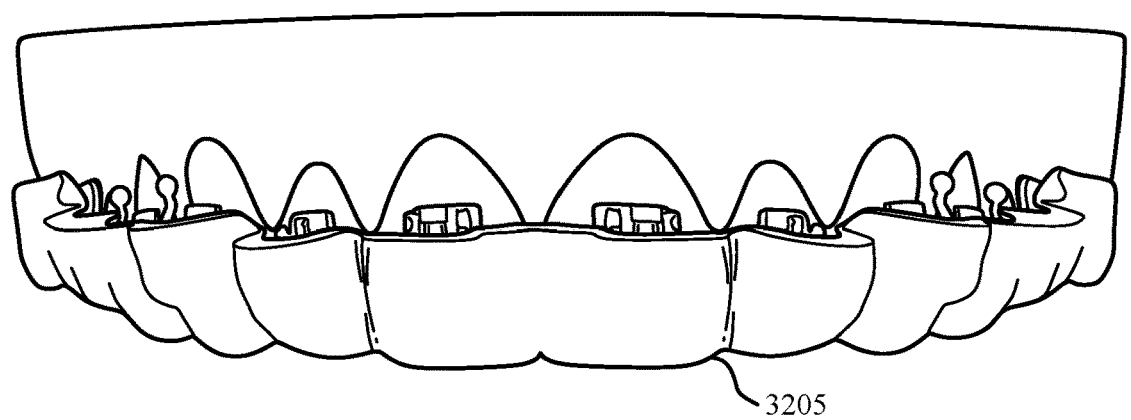
FIG. 32B illustrates an example of a formed bracket tray using a digital model in accordance with aspects of the present disclosure.

FIG. 32A illustrates an example of a formed bracket tray 3205 using a digital model in accordance with aspects of the present disclosure. For example, the formed bracket tray 3205 may be a completed bracket tray with brackets mounted thereto. The formed bracket tray 3205 may result from a model-forming device using an exported digital model to form the tray. FIG. 32B illustrates an example of a formed bracket tray 3205 using a digital model in accordance with aspects of the present disclosure. For example, the formed bracket tray 3205 may be mounted to a person's teeth. Mounting brackets to the teeth using a tray may be one example of a digital direct bonding method or system.

While the treatment system and related methods described with reference to FIGS. 12 through 31 may include various operator inputs, including confirmation of completion of steps and adjustments, it is possible in at least some arrangements to operate a treatment system using substantially an automated automatically operating algorithms. For example, the following list of algorithms may be operable in association with operation of the system and related methods disclosed herein, or a portions thereof.

Figure 12:
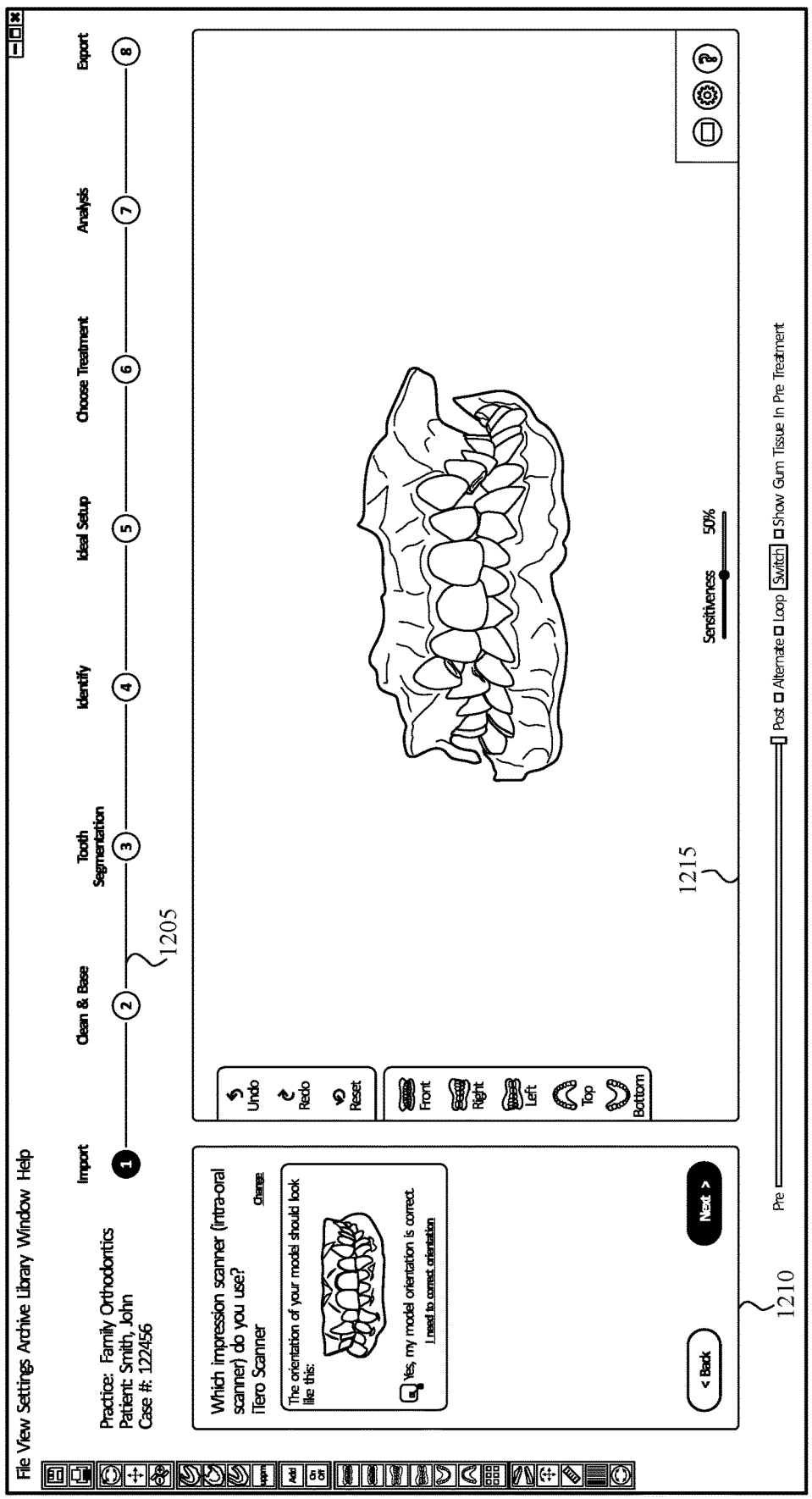
FIGS. 12 through 31 illustrate examples user interfaces in accordance with aspects of the present disclosure.

Example Algorithms
  Auto corrects any overlapping, intersecting, or flipped vertices (triangles), and corrects any incorrect edges
  Auto fills any holes larger than about 1 cm.
  Auto identifies upper and lower gingival line (needed for next algorithm)
  Auto removes excess tissue from the upper and lower arches
  Auto fills missing gingiva areas and creates flat bases for both arches
  Auto tooth segmentation
  Auto identifies and places markers on all tooth cusps
  Auto identifies and places markers on the long axis of all teeth
  Auto identifies and places markers on all mesial/distal tooth widths
  Auto identifies and places markers on all posterior marginal ridges
  Auto identifies and places arch wire forms on both the upper and lower arches
  Auto moves all teeth to their ideal occlusal rotations (rotating)
  Auto moves all teeth to their ideal long axis angulations (tipping)
  Auto moves all teeth to their ideal mesial/distal intrusions (torqueing)
  Auto moves all teeth to their ideal protractions (in/out)
  Auto moves all teeth to their ideal proclinations (up/down)
  Auto moves all teeth to their ideal mesial/distal Intersections (side-to-side)
  Auto moves upper and lower arches into their ideal bite position
  Auto bracket placement
  Auto custom bracket selection and placement (e.g., KLOwen)
  Auto tissue morphing
  Auto tooth cap creation
  Auto IPR (interproximal reduction)
  Auto bracket collision
  Auto occlusal bite collision
  Auto Bolton analysis
  Auto bracket box creation
  Auto bracket box merge with tooth/bracket mask
  Auto cut and remove all gingival bracket box tops
  Auto thicken/extrude mask
  Auto fill gap between outer shell and inner mask
  Auto creates and exports exact number of arches needed for removable aligners Each of these algorithms may include multiple inputs and multiple steps. Any one of these steps of the treatment system and treatment methods of FIGS. 12 through 31 may involve one or more of these algorithms. An algorithm may be initiated by operator input or may operate in response to an operator selecting among various options as part of operating the treatment system. In at least one example, the operation of step 1 of the treatment system as represented in FIG. 12 may relate to or be one example of the method 400 in FIG. 4. The cleaning step of FIGS. 13 through 15 may be one example of the method 500 shown in FIG. 5. The segmenting step of FIGS. 16 through 18 may be one example of the method 600 described with reference to FIG. 6. The identifying step described with reference to FIGS. 20 through 24 may be one example of the method 700 described with reference to FIG. 7. The ideal setup step of FIGS. 25 and 26 may be one example of the method 800 described with reference to FIG. 8. The treatment step of FIGS. 27 through 29 may be one example of the method 900 described with reference to FIG. 9. The analysis step of FIG. 30 may be one example of the method 1000 of FIG. 10. The export step of FIG. 31 may be one example of the method 1100 if FIG. 11. The steps 1 through 8 described with reference to FIGS. 12 through 31 may be examples of one or more aspects for implementation of the method 300 described with reference to FIG. 3.

Figure 33:
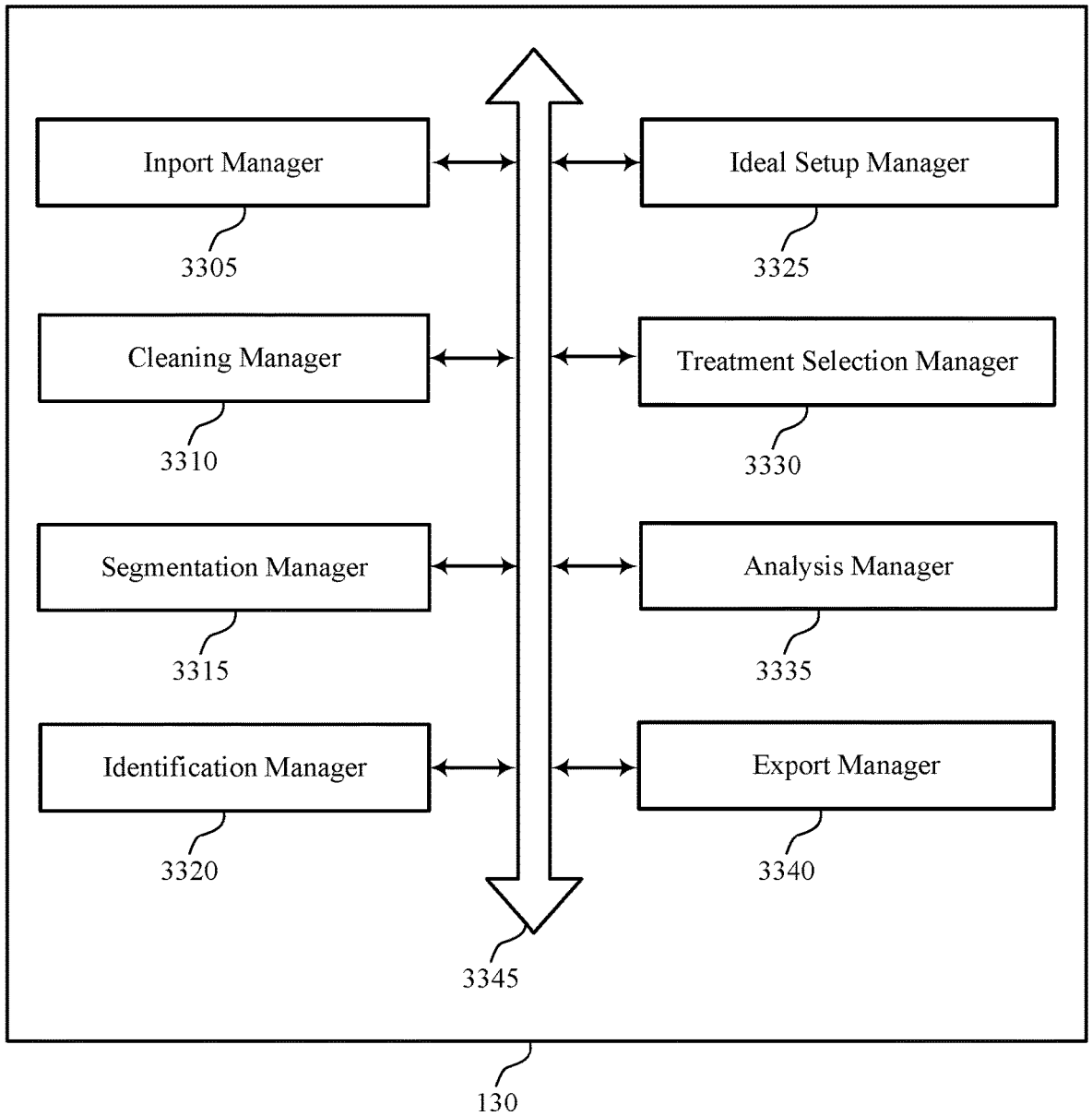
FIG. 33 shows a block diagram of a treatment manager in accordance with aspects of the present disclosure.

FIG. 33 shows a block diagram of a treatment manager 130 in accordance with aspects of the present disclosure. The treatment manager 130 may supports at least one of creation of an orthodontics treatment plan and creation of related data files to be exported for formation of a bracket tray for mounting orthodontics brackets and/or aligners to a person's teeth in accordance with aspects of the present disclosure. The treatment manager 130 may be an example of aspects of the treatment manager 130 described herein. The treatment manager 130 may include an import manager 3305, a cleaning manager 3310, a segmentation manager 3315, an identification manager 3320, an ideal setup manager 3325, a treatment selection manager 3330, an analysis manager 3335, and an export manager 3340. Each of these managers may communicate, directly or indirectly, with one another (e.g., via one or more buses 3345).

The import manager 3305 may perform one or more of the steps and/or functions identified in, for example, the method 400 of FIG. 4 or step 1 of FIG. 12. The cleaning manager 3310 may perform one or more of the steps and/or functions identified in, for example, the method 500 of FIG. 5 and/or step 2 of FIGS. 12 through 15. The segmentation manager 3315 may perform one or more of the steps and/or functions identified in the method 600 of FIG. 6 and/or step 3 of FIGS. 16 through 19. The identification manager 3320 may perform one or more of the steps and/or functions identified in, for example, the method 700 of FIG. 7 and/or step 4 from FIGS. 20 through 24. The ideal setup manager 3325 may perform one or more of the steps and/or functions identified in, for example, the method 800 of FIG. 8 and/or set 5 from FIGS. 25 through 26. The treatment selection manager 3330 may perform one or more of the steps and/or functions identified in, for example, the method 900 of FIG. 9 and/or step 6 from FIGS. 27 through 29. The analysis manager 3335 may perform one or more of the steps and/or functions identified in, for example, the method 1000 of FIG. 10 and/or step 7 from FIG. 30. The export manager 3340 may perform one or more of the steps and/or functions identified in, for example, the method 1100 of FIG. 11 and/or step 8 from FIG. 31.

Figure 34:
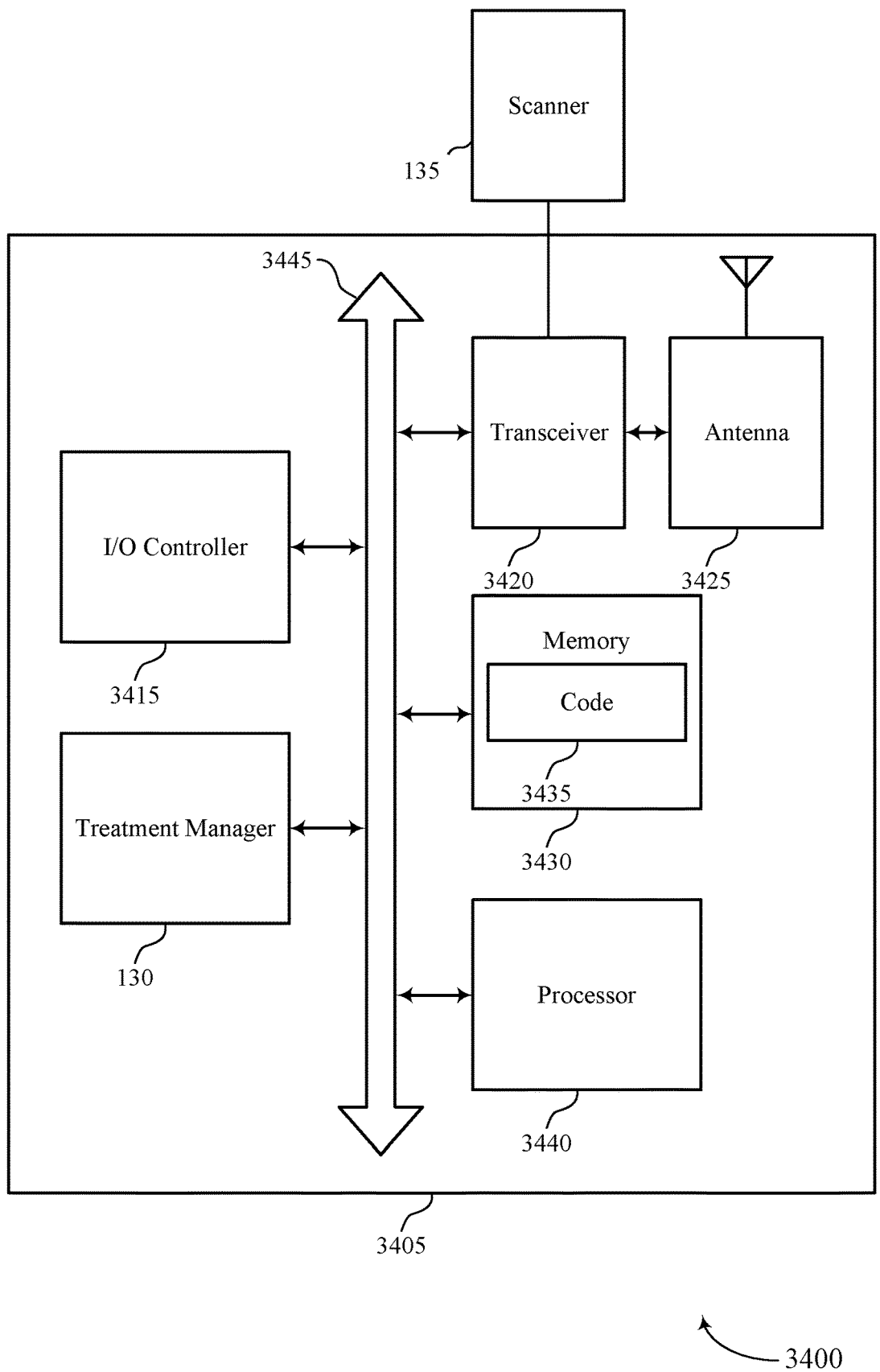
FIG. 34 shows a diagram of a system including a device in accordance with aspects of the present disclosure.

FIG. 34 shows a diagram of a system 3400 including a device 3405 in accordance with aspects of the present disclosure. The system 3400 including the device 3405 may supports at least one of creation of an orthodontics treatment plan and creation of related data files to be exported for formation of a bracket tray for mounting orthodontics brackets and/or aligners to a person's teeth in accordance with aspects of the present disclosure. The device 3405 may be an example of or include the components of a computing device 105 or a formed bracket tray 3205 as described herein. The device 3405 may include components for at least one of creation of an orthodontics treatment plan and creation of related data files to be exported for formation of a bracket tray for mounting orthodontics brackets and/or aligners to a person's teeth, including a treatment manager 130, an I/O controller 3415, a transceiver 3420, an antenna 3425, memory 3430 having code 3435, and a processor 3440. These components may be in electronic communication via one or more buses (e.g., a bus 3445).

The treatment manager 130 may operate to analyze an electronic digital model of a person's teeth generated by an intra-oral scanner (e.g., a scanner 135), provide cleaning of that digital model, segment the digital model to identify individual teeth and separate the teeth from gum tissue of the digital model, identify and mark features of the teeth, generate an ideal or recommended orientation or setup of the teeth, display the ideal set up in conjunction with various selectable treatment methods, and illustrating the pre-treatment, ideal setup, and post-treatment versions of the digital model for observation by an operation of the treatment manager 130. The treatment manager 130 may provide options for user input related to the cleaning, segmenting, identifying, ideal setup, treatment selection, and analysis functionality of the treatment manager. The treatment manager 130 may ultimately generate a digital model of a bracket tray for use by a tray forming device, wherein the formed tray is used for placement of the orthodontics brackets on the person's teeth.

The I/O controller 3415 may manage input and output signals for the device 3405. The I/O controller 3415 may also manage peripherals not integrated into the device 3405. In some cases, the I/O controller 3415 may represent a physical connection or port to an external peripheral. In some cases, the I/O controller 3415 may utilize an operating system such as iOS®, ANDROID®, MS-DOS®, MS-WINDOWS®, OS/2®, UNIX®, LINUX®, or another known operating system. In other cases, the I/O controller 3415 may represent or interact with a modem, a keyboard, a mouse, a touchscreen, or a similar device. In some cases, the I/O controller 3415 may be implemented as part of a processor. In some cases, a user may interact with the device 3405 via the I/O controller 3415 or via hardware components controlled by the I/O controller 3415.

The transceiver 3420 may communicate bi-directionally, via one or more antennas, wired, or wireless links as described herein. For example, the transceiver 3420 may represent a wireless transceiver and may communicate bi-directionally with another wireless transceiver. The transceiver 3420 may also include a modem to modulate the packets and provide the modulated packets to the antennas for transmission, and to demodulate packets received from the antennas. The transceiver 3420 may be in communication with scanner 135-a directly or via antenna 3425. In some cases, the device 3405 may include a single antenna 3425. However, in some cases, the device 3405 may have more than one antenna 3425, which may be capable of concurrently transmitting or receiving multiple wireless transmissions.

The memory 3430 may include a random access memory (RAM) and a read-only memory (ROM). The memory 3430 may store computer-readable, computer-executable code 3435 including instructions that, when executed, cause the processor 3440 to perform various functions described herein. In some cases, the memory 3430 may contain, among other things, a basic input-output system (BIOS) which may control basic hardware or software operation such as the interaction with peripheral components or devices.

The processor 3440 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 3440 may be configured to operate a memory array using a memory controller. In other cases, a memory controller may be integrated into the processor 3440. The processor 3440 may be configured to execute computer-readable instructions stored in a memory (e.g., the memory 3430) to cause the device 3405 to perform various functions.

The code 3435 may include instructions to implement aspects of the present disclosure, including instructions to support the systems and methods disclosed herein. The code 3435 may be stored in a non-transitory computer-readable medium such as system memory or other type of memory. In some cases, the code 3435 may not be directly executable by the processor 3440 but may cause a computer (e.g., when compiled and executed) to perform functions described herein.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for use in an orthodontics treatment plan, comprising:
    receiving a first digital model of at least one of a maxillary arch and a mandibular arch of a person's teeth;
    operating an automated mesh cleaning operation to modify the first digital model;
    automatically segmenting the first digital model to identify individual teeth and gum tissue in the first digital model;
    identifying and marking features of each tooth of the first digital model;
    selecting an arch wire shape based on a law line of the first digital model;
    automatically adjusting the individual teeth of the first digital model into a recommended orientation relative to each other based on identifying and marking features of each tooth and the selected arch wire shape;
    applying a treatment method, the treatment method including selection of a bracket type;
    automatically determining a proposed location of brackets on the individual teeth based on the applied treatment method; and
    generating a second digital model of a bracket tray for mounting the brackets on each tooth, the bracket tray comprising a plurality of bracket seats receptive of the brackets and a plurality of seats to interface with each tooth.

2. The method of claim 1, further comprising:
    exporting the first digital model with the proposed location of brackets on the individual teeth for use in generating the second digital model of the bracket tray.

3. The method of claim 2, wherein receiving the first digital model includes one or more of identifying different views for the first digital model or information about what type of scanner was used to create the first digital model.

4. The method of claim 1, wherein operating the automated mesh cleaning operation includes at least one of increasing resolution of the first digital model, repairing image data of the first digital model, smoothing out surfaces of the first digital model, removing extraneous data from the first digital model, and reducing resolution of the first digital model.

5. The method of claim 1, further comprising:
    receiving user edits to the first digital model to at least one of repair image data of the first digital model, smooth out surfaces of the first digital model, and remove extraneous data from the first digital model.

6. The method of claim 1, wherein segmenting the first digital model includes receiving input from a user regarding accurate segmentation of the individual teeth from each other.

7. The method of claim 1, wherein segmenting the first digital model includes receiving input from a user regarding a change in boundary between one or more teeth and tissue of the first digital model, or regarding a change in boundary between adjacent teeth of the first digital model.

8. The method of claim 1, wherein identifying and marking features of each tooth includes at least one of identifying a long axis, identifying cusp tips, identifying marginal ridges between cusps, and identifying a width of each tooth.

9. The method of claim 1, wherein identifying and marking features of each tooth includes receiving input from a user regarding a change in location of at least one of a long axis, cusp tips, marginal ridges between cusps, and a width of each tooth.

10. The method of claim 1, further comprising:
    selecting the arch wire shape from among natural, tapered and universal arch wire forms.

11. The method of claim 1, further comprising:
    receiving a selection of the arch wire shape from a user among natural, tapered and universal arch wire forms.

12. The method of claim 1, wherein adjusting the individual teeth of the first digital model into the recommended orientation relative to each other includes aligning the individual teeth with the selected arch wire shape.

13. The method of claim 1, wherein adjusting the individual teeth of the first digital model into the recommended orientation relative to each other includes at least one of moving one or more of the individual teeth in a side-to-side direction, in a forward or back direction, in an up or down direction, or a rotated left or rotated right direction.

14. The method of claim 1, wherein adjusting the individual teeth of the first digital model into the recommended orientation relative to each other includes receiving input from a user confirming whether a second recommended orientation of the at least one of the maxillary arch and the mandibular arch is correct.

15. The method of claim 1, wherein adjusting the individual teeth of the first digital model into the recommended orientation relative to each other includes receiving input from a user regarding an occlusal bit between the maxillary arch and the mandibular arch is correct.

16. The method of claim 1, wherein determining the proposed location of brackets includes positioning an arch wire having the selected arch wire shape at a location spaced away from an occlusal plane, and aligning the brackets relative to a long axis line of each tooth.

17. The method of claim 1, wherein applying the treatment method includes selecting a type of bracket based on a selected treatment method and characteristic of one or more of the individual teeth.

18. The method of claim 1, further comprising:
    analyzing the first digital model with the individual teeth in the recommended orientation, the analyzing including at least one of:
        determining whether teeth of the maxillary arch interfere with teeth of the mandibular arch;
        determining whether expansion or extraction of at least one of the maxillary arch and the mandibular arch is required in view of a mouth size of the person;
        determining whether brackets mounted to teeth of the maxillary arch interfere with brackets mounted to teeth of the mandibular arch; and
        determining whether bite turbos are recommended to prevent interference between brackets mounted to the individual teeth.

19. An apparatus for use in an orthodontics treatment plan, comprising:
    a processor,
    memory coupled with the processor; and
    instructions stored in the memory and executable by the processor to cause the apparatus to:
        receive a first digital model of at least one of a maxillary arch and a mandibular arch of a person's teeth;
        operate a mesh cleaning operation to modify the first digital model;
        segment the first digital model to identify individual teeth and gum tissue in the first digital model;
        identify and mark features of each tooth of the first digital model;

select an arch wire shape based on a jaw line of the first digital model;
adjust the identified and marked teeth of the first digital model into a recommended orientation relative to each other based on identifying and marking features of each tooth and the selected arch wire shape;
apply a treatment method, the treatment method including selection of a bracket type;
determine recommended locations for brackets on the individual teeth based on the applied treatment method;
receive input from a user regarding at least one of:
 edits to the modified first digital model;
 edits to the segmented first digital model;
 edits to the identified and marked features;
 edits to the recommended orientation of one or more of the individual teeth;
 a treatment method selection; and
 edits to the recommended locations for the brackets; and
generate a second digital model of a bracket tray for mounting the brackets on each tooth, the bracket tray comprising a plurality of bracket seats receptive of the brackets and a plurality of seats to interface with each tooth.

20. A non-transitory computer-readable medium storing code for use in an orthodontics treatment plan, the code comprising instructions executable by a processor to:

receive a first digital model of at least one of a maxillary arch and a mandibular arch of a person's teeth;
operate a mesh cleaning operation to modify the first digital model;
segment the first digital model to identify individual teeth and gum tissue in the first digital model;
identify and mark features of each tooth of the first digital model;
select an arch wire shape based on a jaw line of the first digital model;
adjust the identified and marked teeth of the first digital model into a recommended orientation relative to each other based on identifying and marking features of each tooth and the selected arch wire shape;
apply a treatment method to the recommended orientation, the treatment method including selection of a bracket type;
determine recommended locations for brackets on the individual teeth based on the applied treatment method;
display at least one of the recommended locations on each of the individual teeth or the at least one of brackets and aligners on the individual teeth at the recommended locations; and
generate a second digital model of a bracket tray for mounting the brackets on each tooth, the bracket tray comprising a plurality of bracket seats receptive of the brackets and a plurality of seats to interface with each tooth.

\* \* \* \* \*